United States Patent
Mester et al.

(10) Patent No.: US 7,478,424 B2
(45) Date of Patent: Jan. 13, 2009

(54) PROPAGATION PROTECTION WITHIN A NETWORK

(75) Inventors: Michael L. Mester, St. Louis, MO (US); Bradley W. Gunsalus, St. Louis, MO (US)

(73) Assignee: Cymtec Systems, Inc., St. Louis, MO (US)

( * ) Notice: Subject to any disclaimer, the term of this patent is extended or adjusted under 35 U.S.C. 154(b) by 679 days.

(21) Appl. No.: 11/040,060

(22) Filed: Jan. 21, 2005

(65) Prior Publication Data

US 2006/0130142 A1 Jun. 15, 2006

Related U.S. Application Data

(60) Provisional application No. 60/631,764, filed on Nov. 30, 2004.

(51) Int. Cl.
G06F 9/00 (2006.01)
H04L 9/00 (2006.01)

(52) U.S. Cl. .......................................... 726/11; 713/153

(58) Field of Classification Search .............. 726/6, 726/26; 713/153, 200, 201, 229; 709/229
See application file for complete search history.

(56) References Cited

U.S. PATENT DOCUMENTS

| | | | | |
|---|---|---|---|---|
| 5,748,888 | A * | 5/1998 | Angelo et al. ............... 726/26 |
| 5,892,903 | A | 4/1999 | Klaus |
| 5,944,821 | A | 8/1999 | Angelo |
| 6,701,440 | B1 | 3/2004 | Kim et al. |
| 7,239,877 | B2 | 7/2007 | Corneille et al. ......... 455/456.3 |
| 7,249,191 | B1 | 7/2007 | Hutchison et al. .......... 709/236 |
| 7,287,278 | B2 | 10/2007 | Liang ........................... 726/22 |
| 7,290,050 | B1 | 10/2007 | Smith et al. ................ 709/224 |
| 7,308,703 | B2 | 12/2007 | Wright et al. ................... 726/1 |
| 2002/0019945 | A1 | 2/2002 | Houston et al. |
| 2002/0023228 | A1 * | 2/2002 | Schlesinger et al. ......... 713/201 |
| 2002/0078381 | A1 | 6/2002 | Farley et al. |
| 2002/0104014 | A1 | 8/2002 | Zobel et al. |
| 2002/0120865 | A1 * | 8/2002 | Schwab et al. .............. 713/201 |
| 2002/0129239 | A1 * | 9/2002 | Clark ......................... 713/153 |
| 2002/0184532 | A1 | 12/2002 | Hackenberger et al. |
| 2003/0154399 | A1 * | 8/2003 | Zuk et al. ................... 713/201 |
| 2003/0167404 | A1 * | 9/2003 | Han et al. ................... 713/201 |
| 2003/0191848 | A1 * | 10/2003 | Hesselink et al. ........... 709/229 |

(Continued)

OTHER PUBLICATIONS

Demetrios Stamatelakis, IP Layer Restoration and Network Planning Based on Virtual Protection Cycles, IEEE Journal, vol. 18, No. 10, Oct. 2000; pp. 1-12.*

(Continued)

*Primary Examiner*—Kambiz Zand
*Assistant Examiner*—Monjour Rahim
(74) *Attorney, Agent, or Firm*—Proskauer Rose LLP

(57) ABSTRACT

Described are methods and apparatus, including computer program products, for propagation protection within a network. A transparent network appliance monitors data being transmitted from a first portion of the network to a second portion of the network through the network appliance and analyzes the data to determine whether the data represents a threat to the network. The network appliance transmits the data to the second portion of the network if the data does not represent a threat to the network or prevents transmission of the data to the second portion of the network if the data represents a threat to the network.

32 Claims, 13 Drawing Sheets

U.S. PATENT DOCUMENTS

| | | | |
|---|---|---|---|
| 2003/0217283 A1* | 11/2003 | Hrastar et al. | 713/200 |
| 2004/0025015 A1 | 2/2004 | Satterlee et al. | |
| 2004/0049698 A1 | 3/2004 | Ott et al. | |
| 2004/0083388 A1* | 4/2004 | Nguyen | 713/201 |
| 2004/0128554 A1* | 7/2004 | Maher et al. | 713/201 |
| 2004/0249958 A1* | 12/2004 | Ozdemir et al. | 709/229 |
| 2004/0268150 A1* | 12/2004 | Aaron | 713/201 |
| 2005/0050334 A1 | 3/2005 | Liang et al. | 713/188 |
| 2005/0050336 A1 | 3/2005 | Liang et al. | 713/188 |
| 2005/0050337 A1 | 3/2005 | Liang et al. | 713/188 |
| 2005/0102526 A1 | 5/2005 | Davey et al. | 713/188 |
| 2005/0149747 A1* | 7/2005 | Wesinger et al. | 713/200 |
| 2006/0048222 A1 | 3/2006 | O'Connor et al. | 726/22 |
| 2006/0272012 A1* | 11/2006 | Wu | 726/6 |

OTHER PUBLICATIONS

"Gateway and Network Protection." Proventia; available at: http://documents.iss.net/literature/proventia/Proventia_GatewayNetworkProtectionBrochure.pdf.

"Firegate Sentry White Paper", Wiresoft, 2004, http://wiresoft.net/products/sentry/Firegate_Sentry_White_Paper.pdf (pp. 1-16).

"Using the ET/BWMGR Traffic Analysis Tool", Emerging Technologies, printed on Dec. 15, 2004 from http://www.etinc.com/index.php?page=traffic.html (pp. 1-8).

Miller, E. "Strong Security for Distributed File Systems," IBM Research, 2001. (7 pgs).

"Sentry Professional Security Appliance" [online] [retrieved on Nov. 12, 2007], Retrieved from the Internet <URL: http://wiresoft.net/products/sentry/sentry_spec_Professional.pdf> (4 pages).

Office Action dated Apr. 29, 2008 for related U.S. Appl. No. 11/040,336 entitled "Propagation Protection of Email Within a Network."

Office Action dated Sep. 15, 2008 for related U.S. Appl. No. 11/040,305 entitled "Monitoring Propagation Protection Within a Network."

Final Office Action dated Nov. 18, 2008 for U.S. Appl. No. 11/040,336 entitled "Propagation Protection of Email Within a Network.".

* cited by examiner

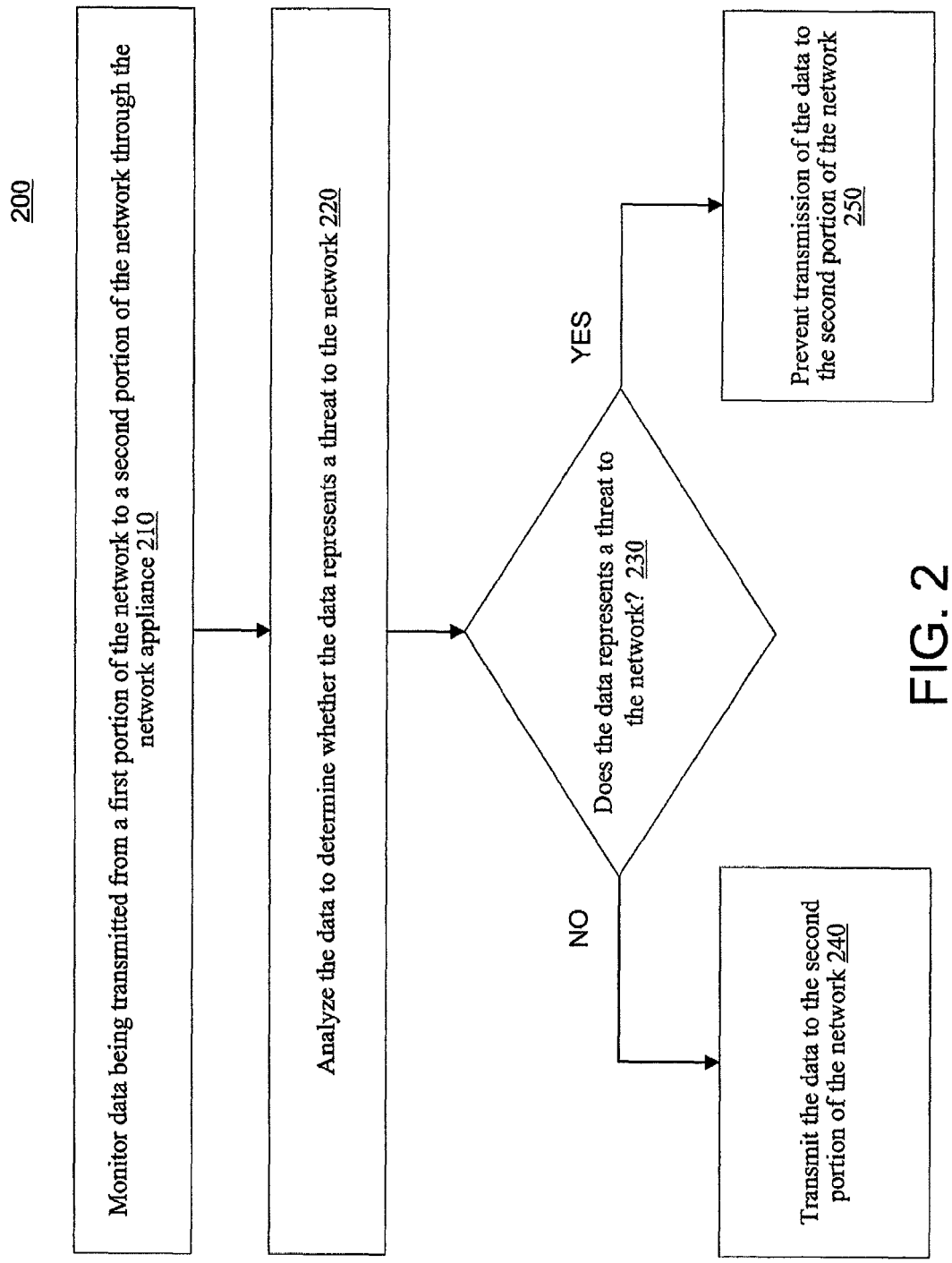

CYMTEC
SENTRY

| | | 700 | Welcome: admin |
|---|---|---|---|
| | | | Logout |

660 — Summary
665 — Events
670 — Devices
675 — Config
680 — Reporting

Devices:
610 — All Devices

EVENTS
         715              720          725                    735
          ↓                ↓            ↓                      ↓         730
                                                                         ↓
| Expand | Threat Name | Count | Last Occurrence | Group By Threat Name | Remove |
|---|---|---|---|---|---|
| ⊟ | IRC Traffic | 12 | 12/22/2004 6:07:08 AM | | Remove |
| ⊟ | 73.150.2.210 | 12 | 12/22/2004 6:07:08 AM | | Remove |
| | 139.209.233.147 | 3 | 12/27/2004 6:05:08 AM | | Remove |
| | 139.255.73.106 | 9 | 12/28/2004 6:07:08 AM | | Remove |
| ⊞ | MAIL Mime Type Exploit | 10 | 12/20/2004 7:08:07 AM | | Remove |
| ⊞ | Win32 IE6 Security Bypass | 5 | 12/17/2004 3:04:04 AM | | Remove |
| ⊞ | Win32 IIS WebDAV Exploit | 18 | 12/22/2004 7:07:07 AM | | Remove |
| ⊞ | Win32 LSASS Exploit | 5 | 12/21/2004 5:05:05 AM | | Remove |
| ⊟ | Win32 MyDoom Web Server | 4 | 12/19/2004 7:07:07 AM | | Remove |
| | 239.57.33.90 | 4 | 12/19/2004 7:07:07 AM | | Remove |
| ⊞ | Win32 UPnP Exploit | 7 | 12/20/2004 6:07:05 AM | | Remove |

705

CYMTEC
SYSTEMS

PROPAGATION PROTECTION WITHIN A NETWORK

RELATED APPLICATIONS

This application claims priority under 35 U.S.C. 119 to U.S. provisional patent application No. 60/631,764 filed on Nov. 30, 2004 and hereby incorporated by reference. This application is related to application Ser. No. 11/040,336, entitled "Propagation Protection Of Email Traffic Within A Network", filed on the same day and hereby incorporated by reference. This application also is related to application Ser. No. 11/040,305, entitled "Monitoring Propagation Protection Within A Network", filed on the same day and hereby incorporated by reference.

FIELD OF THE INVENTION

The present invention relates to computer-based methods and apparatuses, including computer program products, for propagation protection within a network.

BACKGROUND

Typical protection of a network focuses on keeping a threat (e.g., virus, worm, etc.) from entering the network. Firewalls are used to separate a portion of the network that interfaces with and is accessible to a public network (e.g., the Internet) from the rest of a private network, such as a corporate intranet. Some viruses however, include their own servers to communicate with random Internet protocol (IP) addresses and email addresses. Hackers also use chat servers to control a computing device through a Trojan-type threat.

Corporate workstations (e.g., desktop computers, etc.) that are part of the corporate intranet can include an application (e.g., anti-virus software) to identify whether any threats have been inadvertently loaded onto that workstation. Ideally, if the threat is identified before that threat is activated by the user of the infected workstation, that threat can be removed from the workstation before it is propagated onto the corporate network. If the user inadvertently activates the threat before it is identified, the threat is able to infiltrate the corporate network, wreak havoc, and require an inordinate amount of unscheduled resources of a corporation's information technology department to track the source of the threat, isolate the threat, and eliminate it and all of its spawned malicious processes from the network.

SUMMARY OF THE INVENTION

The techniques described herein feature an automated tool that includes computer-based methods and apparatuses, including computer program products, for propagation protection within a network. In general in one aspect, there is a computerized method for propagation protection within a network. The method includes monitoring, by a transparent network appliance, data being transmitted from a first portion of the network to a second portion of the network through the network appliance and analyzing, by the network appliance, the data to determine whether the data represents a threat to the network. The method also includes transmitting the data to the second portion of the network if the data does not represent a threat to the network or preventing transmission of the data to the second portion of the network if the data represents a threat to the network.

In another aspect, there is a transparent network appliance for propagation protection within a network. The network appliance includes a network interface card and a data analyzer module. The transparent network interface card is configured to act as a bridge between a first portion of the network and a second portion of the network. The data analyzer module is configured to analyze data transmitted from the first portion of the network to the second portion of the network to determine whether the data represents a threat to the network and to transmit the data to the second portion of the network if the data does not represent a threat to the network or prevent transmission of the data to the second portion of the network if the data represents a threat to the network.

In another aspect, there is a computerized method for propagation protection of email traffic within a network. The method includes repeatedly storing, by a network appliance, received portions of data associated with email in a buffer associated with an email message until an end of message indicator is received for the email message or a predefined number of bytes have been stored in the buffer before the end of message indicator is received, and preventing at least a final portion of data associated with the email message from being transmitted from the network appliance until a threat determination is made.

In another aspect, there is a network appliance for propagation protection of email traffic within a network. The network appliance includes a network interface card and a data analyzer module. The network interface card is configured to act as a bridge between a first portion of the network and a second portion of the network. The data analyzer module is configured to repeatedly store portions of data received from the first portion of the network and associated with email in a buffer associated with an email message until an end of message indicator is received for the email message or a predefined number of bytes have been stored in the buffer before the end of message indicator is received, and prevent at least a final portion of data associated with the email message from being transmitted to the second portion of the network until a threat determination is made.

In another aspect, there is a computerized method for monitoring propagation protection within a network. The method includes receiving, by a management station, event messages from a plurality of transparent network appliances, each of the event messages comprising a threat indication generated in response to a detected threat in data being transmitted through the respective transparent network appliance.

In another aspect, there is a system for monitoring propagation protection within a network. The system includes a server that includes a management console application that receives event messages from a plurality of transparent network appliances with which the management console communicates, wherein each of the event messages comprises a threat indication generated in response to a detected threat in data being transmitted through the respective transparent network appliance.

In another aspect, there is a computer program product, tangibly embodied in an information carrier, for propagation protection within a network. The computer program product includes instructions being operable to cause data processing apparatus to perform any of the computerized methods described herein.

In other examples, any of the aspects can include one or more of the following features. An alert can be generated when the data represents a threat to the network. The alert can be transmitted to a management server. A (Transmission Control Protocol) TCP session associated with the data can be terminated if the data represents a threat to the network. The data can be compared with known threat profiles. One or more statistics can be established on traffic from the first portion of the network to the second portion of the network. Current statistics associated with the data can be calculated. The current statistics can be compared with the established statistics. The one or more statistics can include a number of connections initiated by a host, a type of connection initiated by the host, or an amount of data transferred from or to the host.

The management server can receive a message from the network appliance. The message can include an event message, a resource message, or a statistics message. The network appliance can receive a message from a management server. The message can include a pause message, a signature activation message, a signature update message, or a signature update package message. An Internet Protocol (IP) address can be assigned to the network appliance. The network appliance can be remotely upgraded. Remotely upgrading can include updating one or more threat profiles. Remotely upgrading can include updating one or more threat analysis methods. A user can be enables (e.g., through a GUI or an external switch) to restore the network appliance to factory defaults. The network appliance can be automatically reset to a previous configuration upon a failed condition. A Web interface can be generated to configure the network appliance to a specific configuration.

The network appliance can include a failsafe module configured to transmit data between a first portion of the network and a second portion of the network in a failed or powerless condition. The failsafe module can be further configured to monitor for a failed condition. The network appliance can include a memory module. The memory module can include a compact flash card. The network appliance can include an extended CMOS module including a binary image of a Basic Input Output System (BIOS) of the network appliance. The network appliance can include an interface configured to communicate with a management module located external to the network appliance. The interface can be associated with an Internet Protocol (IP) address. The network appliance can include a serial interface, including a software console, to enable IP address assignment for the network appliance and to enable initialization of the network appliance.

The final portion of data can be transmitted from the network appliance if the email message does not represent a threat to the network or permanently preventing the transmission of the final portion of data from the network appliance if the email message represents a threat to the network. The email message associated with the buffer or a portion of the email message associated with the buffer can be rebuilt using the received portions of data stored in the buffer. The rebuilt email message or the rebuilt portion of the email message can be analyzed to make a threat determination. The rebuilt email message or the rebuilt portion of the email message can be compared with known threat signatures to make a threat determination. The rebuilt email message or the rebuilt portion of the email message can be transmitted to an antivirus engine for comparison to known threat signatures to make a threat determination.

The network appliance can determine whether a portion of data transmitted through the network appliance is associated with email. It can be determined whether the data is transmitted across a port associated with Simple Mail Transfer Protocol (SMTP). The storing can be performed only after a DATA command associated with the email message is received. The final portion of data can include a portion of data associated with the end of message indicator for the email message or reaching the predefined number of bytes for the email message. A number of buffers reserved for storage of received portions of data can be defined. Portions of data associated with another email message can be received. It can be determined that all of the defined number of buffers are currently associated with email messages different from the another email message. In such a case, transmission of the received portions of data associated with the another email message from the network appliance can be permanently prevented.

An event message can be transmitted from the network appliance to a management server in response to a determination that the email message represents a threat to the network. Additional portions of data associated with a server associated with a whitelist can be received. The additional portions of data can be transmitted from the network appliances without storing them and analyzing them for a threat determination. All data can be transmitted from a first portion of the network to the second portion of a network through the network appliance.

The network appliance can include a memory module for storing the received portions of data. The memory module can include an area for a predefined number of buffers for storing the received portions of data. The data analyzer module can be further configured to rebuild the email message associated with the buffer or a portion of the email message associated with the buffer using the received portions of data stored in the buffer. The data analyzer module can be further configured to transmit the final portion of data to the second portion of the network if the email message does not represent a threat to the network or permanently prevent the transmission of the final portion of data to the second portion of the network if the email message represents a threat to the network.

The management station can generate a graphical user interface. User interface elements can be generated that are associated with a summary of events, events details, device details, or configuration details. User interface elements can be generated to select one or more of the network appliances in the plurality. The user interface elements can correspond to different reporting periods. A graph, a table, or a listing indicating an aggregation of the threats reported in the event messages can be generated. User interface elements can be generated that enable a user to set a particular configuration. The particular configuration can be associated with one of the plurality of network appliances, the plurality of network appliances, or the management station. The particular configuration can be associated with automatic updating. The particular configuration can enable a periodic updating and an immediate manual updating. The particular configuration can be associated with time setting. The particular configuration can be associated with a domain name system (DNS). The particular configuration can be associated with email alerting.

The network appliance can be registered with the management station. Registering can include transmitting a device identifier to the network appliance and receiving an acknowledgement from the network appliance that its device identifier is set to the transmitted device identifier. The management station can include a management server. The management station can include a management console application. In the plurality of network appliances, each network appliance can be configured to analyze data being transmitted from a first portion of the network to a second portion of the network for a threat.

Implementations can realize one or more of the following advantages. The techniques enable a sensor device a unique ability to catch mass mailers that have their own email clients/servers. The techniques inhibit new (e.g., undiscovered) computer viruses from spreading through a corporate network based on the connection patterns they generate (e.g., statistical comparison). The techniques enable enforcement of corporate policy concerning what types of traffic are acceptable from their users and which could potentially pass virus traffic and/or harm the network. The threats are reported and organized for high visibility into traffic patterns, viewable by network security administrators. One implementation of the invention provides at least one of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

FIG. 2 is a block diagram of a process used for propagation protection within a network.

FIG. 7 is a screen shot illustrating another exemplary user interface for monitoring propagation protection within a network.

FIGS. 9A and 9B are screen shots illustrating another exemplary user interface for monitoring propagation protection within a network.

DETAILED DESCRIPTION

Figure 1:
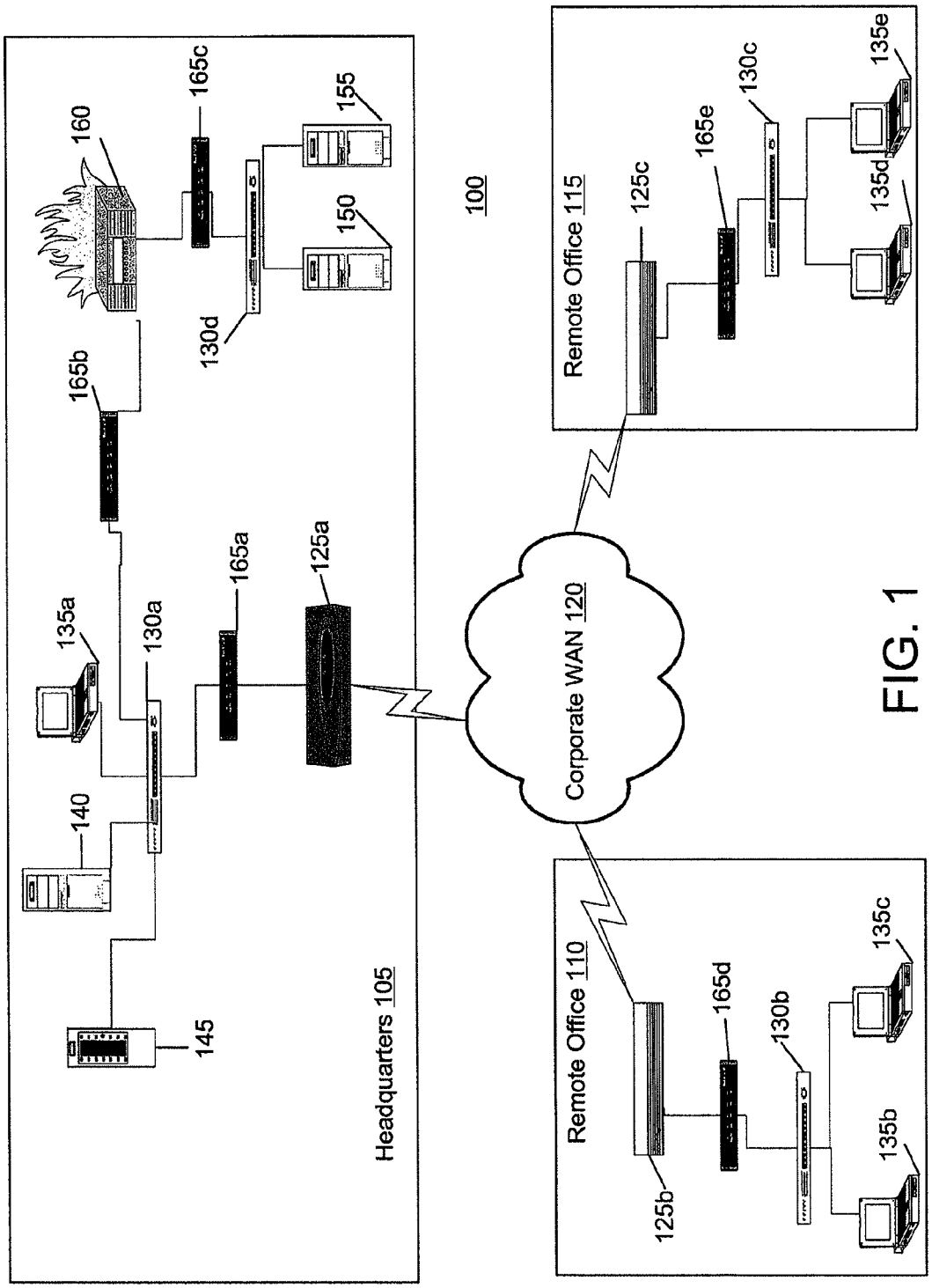
FIG. 1 is a block diagram of a computer system used for propagation protection within a network.

FIG. 1 illustrates a computer system 100 used for propagation protection within a network. The system 100 represents an exemplary system that might be used by a corporation having remote offices. The system 100 includes a first portion 105 that is located at the headquarters of the corporation, a second portion 110 located at a first remote office, and a third portion 115 located at a second remote office. The portions 105, 110, and 115 are in communication with each other via a corporate wide area network (WAN) 120. The WAN 120 can include a private network maintained by the corporation, a virtual private network implemented on a public WAN, such as the Internet, a packet-based network, a circuit-based network (e.g., public switched telephone network (PSTN)) and/or the like. The portions 105, 110, and 115 include routers 125a, 125b, and 125c, respectively, generally referred to as a router 125, that route data to each other and to respective local area network (LAN) switches 130a, 130b, and 130c.

Various devices are in communication with the switches 130. For example, the switch 130a is in communication with a workstation 135a (e.g., a desktop computer, a laptop computer, etc.), a first server 140 (e.g., a file server, an application server, a database server, etc.), and a second server 145. The second server 145 is also referred to as a sensor device management server and its functionality is described in more detail below. Similarly, the switch 130b is in communication with workstations 135b and 135c, and the switch 130c is in communication with workstations 135d and 135e. The first portion 105 also includes a switch 130d, also referred to as a demilitarized zone (DMZ) switch because of its connection to a Web server 150 and an email server 155. The Web server 150 and the email server 155 are accessible to a public network, such as the Internet, so the DMZ switch 130d is connected to another portion of the corporate network via a firewall 160.

The system 100 also includes sensor devices 165a, 165b, 165c, 165d, and 165e, generally referred to as a sensor device 165. In general overview, the sensor device 165 is a transparent network appliance that provides propagation protection against network viruses and other network threats. The term transparent means that there is no need to change existing layer 3 information (e.g., IP addresses in routers, default gateways, static routers, etc.) when the device is added. The sensor device 165 (also referred to as an appliance, a sensor, and a sensor module) functions as a traditional network bridge and as a content filter, and advantageously supports network resiliency. The sensor device 165 includes a failsafe module that allows for the sensor device 165 to become completely passive, even when no power to the device exists. To provide network virus propagation protection, the sensor device 165 performs inspection of data being transmitted through the sensor device 165 from one portion of the network to another portion of the network.

For example, the sensor device 165a monitors network traffic going to and from the portion of the network being serviced by the router 125a (e.g., traffic to/from the first remote office 110 and/or the second remote office 115) and the portion of the network being serviced by the switch 130a (e.g., the workstation 135a and/or the servers 140 and 145). The sensor device 165b monitors network traffic (e.g., inspects packets) flowing between the switch 130a and the firewall 160. The sensor device 165c monitors network traffic flowing between the switch 130d and the firewall 160. The sensor device 165d monitors network traffic going to and from the portion of the network being serviced by the router 125b (e.g., traffic to/from the headquarters 105 and/or the second remote office 115) and the portion of the network being serviced by the switch 130b (e.g., the workstations 135b and/or 135c). The sensor device 165e monitors network traffic going to and from the portion of the network being serviced by the router 125c (e.g., traffic to/from the headquarters 105 and/or the first remote office 110) and the portion of the network being serviced by the switch 130c (e.g., the workstations 135d and/or 135e). In general, the sensor device 165 monitors the network traffic and prevents propagation of threats between portions of the network and/or portions of the system 100 using various techniques.

Some examples are email reassembly, statistical analysis, and signature matching. The sensor device 165 groups events (e.g., detected matches) and informs the sensor device management server 145 (also referred to as and/or includes a management module, a management station, a management server, and a management console) for further processing.

FIG. 2 illustrates a process 200 that the sensor device 165 can use to prevent propagation of threats in a network. The sensor device 165 monitors (210) data being transmitted from a first portion of the network to a second portion of the network through the sensor device 165. The first portion of the network is the portion of the network on one side of the sensor device 165 (e.g., connected to a first port of the sensor device 165) and the second portion of the network is the portion of the network on the other side (e.g., connected to a second port of the sensor device 165). For example, for the sensor device 165b, the first portion of the network is the switch 130a and those devices connected directly to it (e.g., the servers 140 and 145 and the workstation 135*a*) and the second portion of the network is the firewall 160. In another example, for the sensor device 165*a*, the first portion of the network is the router 125*a* and the second portion of the network is the switch 130*a* and those devices connected directly to it (e.g., the servers 140 and 145 and the workstation 135*a*).

The sensor device 165 analyzes (220) the data to determine whether the data represents a threat to the network. A threat can be, for example, a virus, a worm, a Trojan horse, malicious code, unauthorized snooping of a network by a hacker or some other uninvited process (e.g., spider), unauthorized use of a computing device on the corporate network, use of the corporate network for unauthorized data transmission, etc. If the sensor device 165 determines (230) that the data does not represent a threat to the network, the sensor device 165 transmits (240) the data to the second portion of the network. If the sensor device 165 determines (230) that the data does represent a threat to the network, the sensor device 165 prevents (250) transmission of the data to the second portion of the network.

Figure 3A:
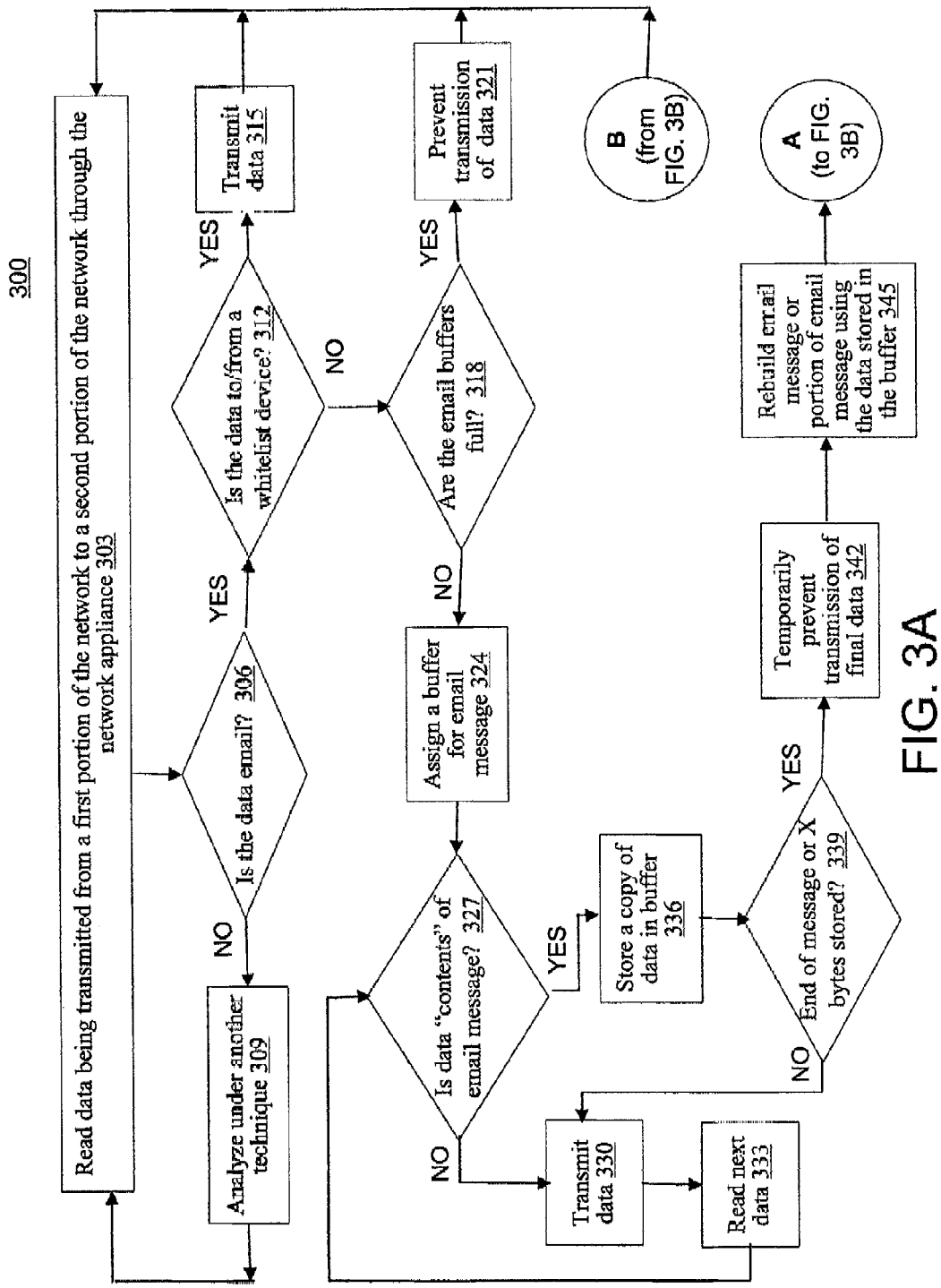
FIGS. 3A and 3B are a block diagram of a process used for email scanning within a network.
Figure 3B:
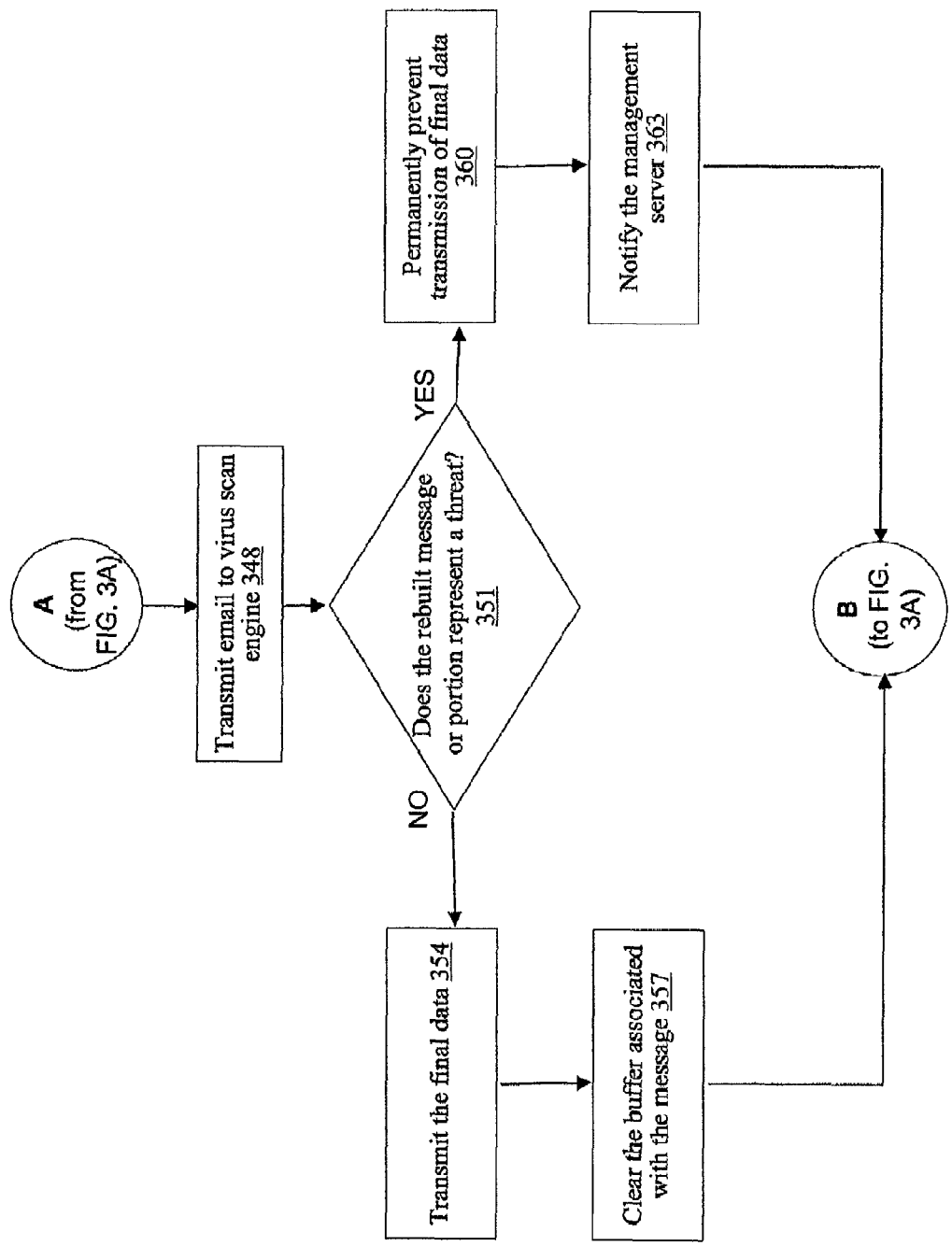

One type of analysis performed by the sensor device 165 is email scanning, which is done in a transparent fashion on the network. FIGS. 3A and 3B illustrate a process 300 that the sensor device 165 can use to perform email scanning. The sensor device 165 reads (303) data as it is transmitted through the sensor device 165 from one portion of the network to another portion of the network, for example from a first device (e.g., the workstation 135*a*) to a second device (e.g., the email server 155). The sensor device 165 determines (306) whether the data is associated with email. For example, the data is associated with email if the data is sent across a standard simple mail transfer protocol (SMTP) port (e.g., port 25 for transmission control protocol (TCP)). If the sensor device 165 determines (306) that the data is not associated with email, the sensor device 165 can analyze (309) the data using one or more of the other techniques described herein.

If the sensor device 165 determines (306) that the data is associated with email, the sensor device 165 determines (312) whether the email data is to or from a device that has been identified on a "whitelist". The "whitelist" lists devices that have adequate screening such that an administrator has identified that data transmitted to or from such device does not need any additional screening. If the sensor device 165 determines (312) that the email data is to or from a device that has been identified on a "whitelist", the sensor device 165 transmits (315) that data through the sensor device 165 without any further inspection.

If the sensor device 165 determines (312) that the email data is not to or from a device that has been identified on a "whitelist", the sensor device 165 determines (318) whether there are is an email buffer available to store all other email data between the two devices related to this email data. An email buffer is a group of memory locations, real or virtual, where related email data can be collected. For example, in a packet-based network, a single email message can be made up of many packets. As described herein, the sensor device 165 collects all of these related packets, so that the sensor device 165 can reassemble the packets and generate the email (e.g., a portion of the email, or the entire email). As the sensor device monitors all data traffic flowing through it, the sensor device 165 advantageously includes these email buffers to have a place to collect the related data. The number of the email buffers can vary. In some examples, the number of email buffers is selected so that under normal conditions, there are enough buffers to collect and analyze all of the email data and under a threat condition (e.g., virus activation), the email buffers all quickly become full, advantageously identifying to the sensor device 165 that a threat condition exists. In one example, the number of buffers is set to 1000.

If the sensor device 165 determines (318) that there are no email buffers available, the sensor device 165 does not transmit (321) the data through the device. If the sensor device 165 determines (318) that there is an email buffer available, the sensor device 165 designates (324) that buffer as the storage buffer for all of the subsequent email data related to this email data. For example, the buffer is associated with an identifier that identifies the buffer for email data for communication between the first device (e.g., the workstation 135*a*) and the second device (e.g., the email server 155). With a buffer designated, the sensor device 165 determines (327) whether the email data relates to non-content information of the email communication, for example establishing a session between the first device and the second device (e.g., in SMTP, a "MAIL" command and/or a "RCPT" command), or whether the email data represents the contents of the email communication (e.g., in SMTP, a "DATA" command). If the sensor device 165 determines (327) that the email data relates to non-content information, the sensor device 165 transmits (330) the data to the second portion of the network. In some examples, the sensor device does not save this non-content data to the designated buffer. This technique advantageously requires less size for the buffers. This technique also advantageously enables the sensor device 165 to detect multiple subsequent email messages between the first device and the second device, which might be sent using subsequent "DATA" commands without the re-transmission of the non-content commands. The sensor device 165 reads (333) the next related email data being sent between the first device and the second device.

If the sensor device 165 determines (327) that the email data relates to content information, the sensor device 165 saves (336) a copy of the data into the associated designated buffer. The sensor device determines (339) whether there is "X" bytes saved into the designated buffer or whether there has been an end of mail data indicator (e.g., in SMTP, a line containing only a period). The quantity "X" can be chosen based on a scan engine that is used in the email scanning process 300. A scan engine may only require the first "X" bytes of an email communication to determine whether the email communication contains a threat signature. In such cases, the "X" byte limit can advantageously limit the size of the buffer required, so that email communications with large attachments do not consume all to the memory of the sensor device 165 during analysis. In one example, the "X" byte limit is set to 50,000. If the sensor device 165 determines (327) that less than "X" bytes have been saved or that there is not an end of message indicator, the sensor device 165 transmits (330) the data to the second portion of the network and reads (333) the next related email data being sent between the first device and the second device.

If the sensor device 165 determines (327) that "X" bytes have been saved or that there is an end of message indicator, the sensor device 165 temporarily prevents (342) transmission of this final piece of data (e.g., the received packet that has the end of message indicator or the received packet that causes "X" bytes to be stored) to the second portion of the network. By not forwarding this data at this time, the sensor device 165 effectively prevents the email communication from being successfully transferred should the sensor device 165 detect a network threat associated with this email communication. The sensor device 165 reassembles (345) the data stored in the designated buffer and transmits (348) the assembled email, communication (e.g., the whole communication if an end of message indicator is received or a portion of the message if the X byte limit is reached) to an antivirus engine (e.g., a commercially available antivirus engine, such as Sophos Antivirus manufactured by Sophos Plc of Abington, United Kingdom). The antivirus engine indicates to the sensor device 165 whether there is a threat detected. In some examples, the antivirus scan engine is included in the sensor device 165.

Based on the indication from the antivirus engine, the sensor device 165 determines (351) whether the email communication should be prevented. If the sensor device 165 determines (351) that the email communication should not be prevented, the sensor device 165 transmits (354) the data (i.e., that was temporarily prevented (342)) to the second portion of the network and clears (357) the designated buffer to make the buffer available for the next email communication. With all of the email data forwarded to the second device (e.g., the email server 155), the second device has the complete email communication and can process the email communication in its normal course. If the sensor device 165 determines (351) that the email communication should be prevented, the sensor device 165 permanently prevents (360) transmission of the data (i.e., that was temporarily prevented (342)) to the second portion of the network. Without all of the email data forwarded to the second device (e.g., the email server 155), the second device does not receive the complete email communication and cannot process the email communication in its normal course. If applicable, the sensor device 165 terminates the TCP session associated with the email communication. The sensor device 165 notifies (363) a management server (e.g., transmits a message to the management server 145) that a threat has been detected and prevented from being propagated to another device in the network. The sensor device 165 can provide to the management server information such as the two devices involved in the email communication, the type of threat detected, the time of the email communication, etc.

Another type of analysis performed by the sensor device 165 is threat profile (also referred to as signature) matching. In some examples, the format of a threat profile includes key-value pairs. In such examples, the keys of the threat profiles can include any fields that are defined by any of the standards governing the type of data that is transferred through a network in which the sensor device 165 is located. For example, the threat profile can include Internet Protocol (IP) protocol fields and/or ports that are specific to the expected traffic of a particular threat. A profile also may include one or more keys that correspond to specific packet header fields and values that compare by exact match, min, or max. The keys can be numbered according to an enumeration of packet header fields that can be examined (e.g., a TCP destination port value of "80" can be formatted as "15 80;"). A profile also may include content keys and subsequent modifiers. The values for the content keys can be, for example, application-layer data content to be matched, written in hex representation. Each content specification may have subsequent modifiers. Examples can include "ignoreCase", "ignoreCrlf", "minStartPos", "maxStartPos", "startWithin", etc. These modifiers can specify where in the packet data payload to look for the content. Table 1 includes some examples of threat profiles that the sensor device 165 can use to determine whether the data passed through the sensor device 165 represents a threat to the network. In these examples, the format is "key value; key value; . . . ".

TABLE 1

| Sample Profile | Name parameter | Protocol parameter | Port parameter | Content parameter | Content modifier | Active indication |
| --- | --- | --- | --- | --- | --- | --- |
| sig_name Sample Sig; proto 6. | sig_name Sample Sig | proto 6 | | | | |
| sig_name Chat Yahoo Login; proto 6; 15 5050; content 594D5347; maxStartPos 0; active 1. | sig_name Chat Yahoo Login | proto 6 | 15 5050 | content 594D5347 | maxStartPos 0 | active 1 |
| sig_name P2P BitTorrent Peer Sync; proto 6; content 0000000D0600; maxStartPos 0; active 1. | sig_name P2P BitTorrent Peer Sync | proto 6 | | content 0000000D0600 | maxStartPos 0 | active 1 |

The profiles in Table 1 include a value for the name parameter (i.e., sig_name). The sensor device 165 can use this value (e.g., Sample Sig) for reporting whenever the threat profile is matched. The name parameter and corresponding value are used for reporting purposes and to identify the known threats for which the sensor device 165 monitors. This name parameter is not used for matching purposes. In IP, there is a "proto" field that is used to identify a protocol to indicate the corresponding type of IP traffic to match against for that profile. The profiles in Table 1 include a value of "6" (decimal) for the "proto" field. In IP, a value of "6" represents TCP. The IP standard defines the values for other protocols, such as "1" (decimal) for internet control message protocol (ICMP), "17" (decimal) for user datagram protocol (UDP), etc.

The "Chat Yahoo Login" threat profile in Table 1 includes a port parameter with a key of "15" and a value of "5050". In TCP, the key "15" indicates a destination port and the value "5050" represent the 16-bit destination port number that identifies the TCP connection. This advantageously enables the sensor device 165 to apply threat profiles only to data associated with a particular port to which the threat corresponds. For example, if the threat profile represents a Web threat, then a port parameter can be used so that the sensor device 165 only reads the contents of data associated with a Web port (e.g., 80, 8080, 443).

Both the "Chat Yahoo Login" threat profile and the "P2P BitTorrent Peer Sync" threat profile in Table 1 have content keys and values to be matched. The content key represents the content of the data being inspected (e.g., non-header information). For example, in TCP, the content is located in the "data" field. The value (e.g., 594D5347 or 0000000D0600) is the value that the sensor device 165 matches to determine that the data does represent a threat to the network. Both the "Chat Yahoo Login" threat profile and the "P2P BitTorrent Peer Sync" threat profile in Table 1 also use content modifier parameters. The "maxStartPos" modifier represents the maximum bit position in the indicated content field from which the sensor device 165 should start the comparison. The value of zero indicates that the comparison should start from the first bit in the indicated content field (e.g., there should be no offset in the comparison).

Both the "Chat Yahoo Login" threat profile and the "P2P BitTorrent Peer Sync" threat profile in Table 1 also use an active indication parameter. Like the name parameter, this active indication parameter is not used for direct comparison. The active indication parameter indicates to the sensor device 165 whether a particular threat profile is active or not. For example, if a threat profile is active (e.g., has a value of "1"), this indicates that the sensor device should compare the data (e.g., a received packet) to that threat profile to determine if that data matches the profile (thus indicating a threat to the network). If a threat profile is not active (e.g., has a value of "0"), this indicates that the sensor device should not compare the data (e.g., a received packet) to that threat profile. If there is no value for the active indication parameter (e.g., the "Sample Sig" profile), the default can be that the particular threat profile is always active. This advantageously enables an administrator to individually activate profiles in an individual sensor device 165 without having to recreate, version, and retransmit the entire list of profiles again. For example, the administrator can use a graphical user interface (GUI) in association with the management server 145 to configure (e.g., activate/inactivate specific threat profiles). When changes are made, the sensor device 165 can receive updates from the management server 145 (e.g., via a management console application executing on the management server 145) for new threat profiles. The management server 145 can obtain updates to threat profiles on a regularly scheduled basis or on a manual basis initiated by an administrator. To obtain the updates, the management server 145 can communicate over a network (e.g., the Internet) to a server established for providing such updates. For example, the server 145 can communicate with a Website of the manufacturer Cymtec Systems, Inc. of St. Louis, Mo., to obtain updates to the threat profiles.

Figure 4:
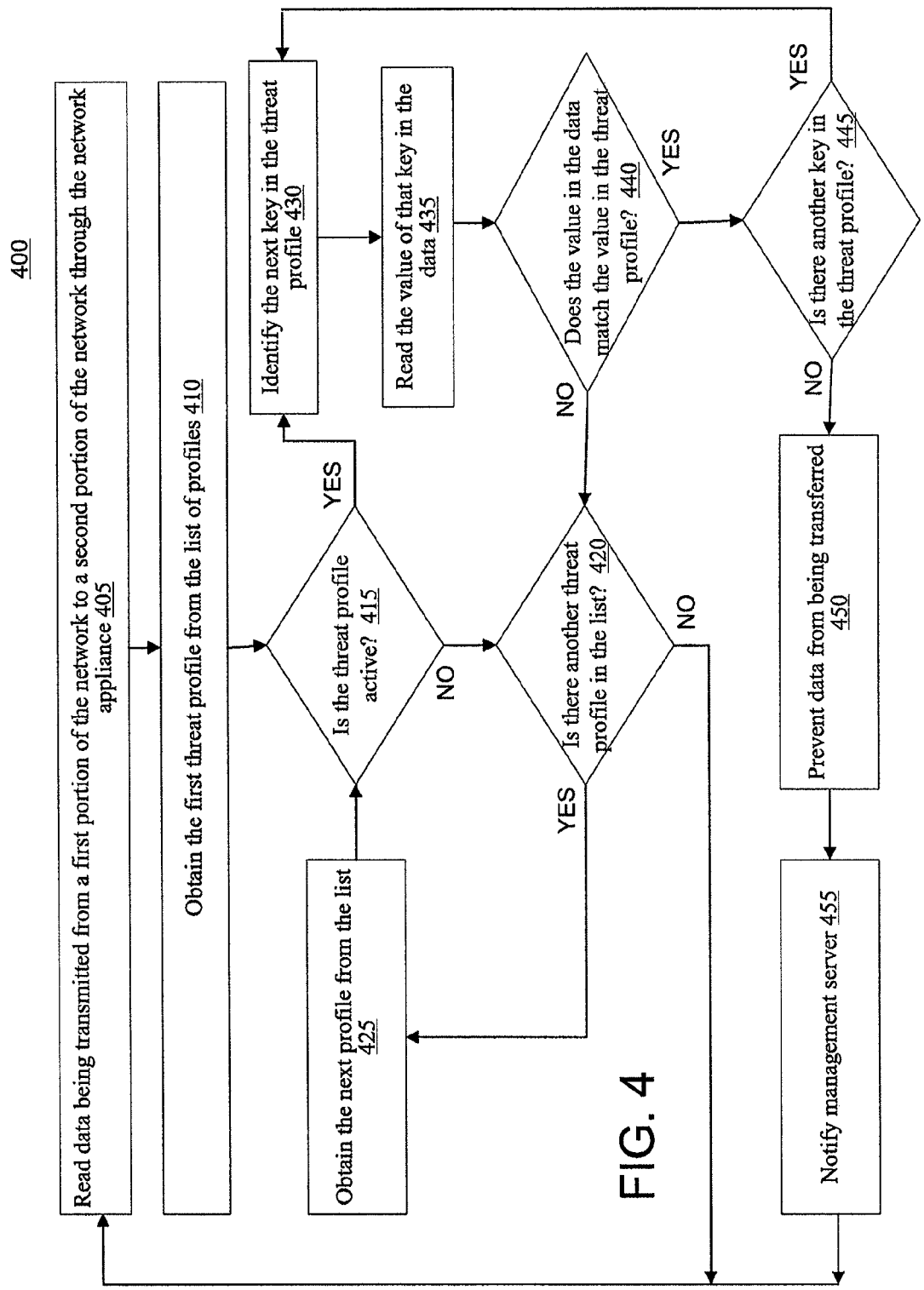
FIG. 4 is a block diagram of a process used for threat profile scanning within a network.

FIG. 4 illustrates a process 400 that the sensor device 165 can use to perform a threat profile matching analysis. The sensor device 165 reads (405) data as it is transmitted through the sensor device 165 from one portion of the network to another portion of the network, for example from a first device (e.g., the workstation 135b) to a second device (e.g., the server 140). The sensor device 165 includes, for example in persistent storage, a list of one or more threat profiles. The sensor device 165 obtains (410) the first threat profile from the list.

The sensor device 165 determines (415) whether the threat profile is active. For example, the threat profile can have an active indicator (e.g., the active indication parameter in Table 1) that the sensor device 165 can read, with a first value indicating that the threat profile is active and a second value indicating that the threat profile is inactive. If the sensor device determines (415) that the threat profile is inactive, the sensor device 165 ignores that profile and determines (420) whether there is another profile in the list. If there is another profile, the sensor device obtains (425) the next profile from the list. The sensor device 165 determines (415) whether the threat profile is active.

If the sensor device determines (415) that the threat profile is active, the sensor device 165 identifies (430) the first key in the threat profile. As described in some examples above, a key can be a defined field in the data. The sensor device reads (435) the value for that key in the data. The sensor device 165 compares the value of the key in the data to the value in the threat profile to determine (440) if the two match. If the two do not match, then there is no need to continue with that threat profile, so the sensor device 165 determines (420) whether there is another profile in the list.

If the two do match, then the sensor device 165 determines (445) whether there is another key in the threat profile to be matched. In other words, as described above, there are some keys (e.g., name of threat profile, active indication) that are used for managing the threat profile and are not used to compare with values in the data, so these keys are not to be matched. If there is another key to be matched, the sensor device 165 identifies (430) the next key in the threat profile. The sensor device 165 reads (435) the value for that key, determines (440) if the value in the data matches the threat profile, and, if there is a match, determines (445) if there are any other keys in the threat profile. As described in the examples above, some keys may be modifiers of other keys. In such cases, the sensor device 165 also obtains the associated modifier(s) when the sensor device 165 obtains the key and uses the modifier value(s) in determining (440) whether there is a match. The sensor device 165 repeats items 430, 435, 440, and 445 until there are no matches or until all of the keys in the threat profile have been analyzed for matches. As described above, when there is not a match, the sensor device 165 proceeds to determine (420) whether there is another profile in the list. In other words, if there is a value that does not match, then the threat associated with that particular threat profile is not present in the data, and there is no need to continue analyzing that threat profile any further.

If the sensor device 165 matches all of the values for all of the keys in the threat profile, then this indicates that the threat associated with that particular threat profile is present in the data and the sensor device 165 prevents (450) that data from being transmitted to the second portion of the network. Depending on the type of data, the sensor device can take further action to prevent propagation of this detected threat. For example, if the data is associated with TCP, the sensor device 165 can transmit appropriate messages to the first device and the second device between which the data is being sent to terminate the session between those devices. The sensor device 165 also notifies (455) a management server (e.g., the management server 145). This notification transmits to the server particular information about the threat detected and the devices involved. For example, an event message, described in more detail below, can be used for such notification.

In Table 1, the threat profile "Sample Sig" has only 1 key to match, the "proto" key with a value of "6" indicating TCP. This example illustrates how the sensor device 165, using the threat profile type of analysis, can enforce policy constraints within a network, working, for example, at a high level of inspection (e.g., a packet header), to control an entire type of data traffic without having to inspect the contents (e.g., non-header) of the data. For example, peer-to-peer file swapping within a corporate intranet cannot be prevented by a firewall at the edge of the intranet. The sensor device 165, however, monitors intranet data traffic and advantageously can include a threat profile that matches a peer-to-peer file swapping protocol and thus prevents such data from flowing within the corporate intranet. Similarly, real-time data traffic (e.g., voice over IP (VoIP)) can be inspected at a high level (e.g., at the packet header level), will not be matched at that level, and can be passed through without further inspection and with little or no delay.

Another type of analysis performed by the sensor device 165 is statistical analysis. In general overview, the sensor device 165 provides anomaly detection by determining what normal traffic is for a particular section of the network. The sensor device 165 can accomplish this by transparently reviewing the traffic flowing through the sensor device 165 and collecting certain statistics. In some examples, the sensor device 165 collects connection statistics. For example, the connection statistics can indicate, on a host-by-host basis, the numbers and types of connections initiated by that host, and the amount of data transferred. In general, there is a break-in period for each new host (or in the case of initial deployment, all hosts) in which the network is considered to be "running normally". The sensor device 165 uses the connection statistics from this break-in period to form a "baseline" against which the sensor device 165 compares subsequent statistics.

To determine the presence of a threat, the sensor device 165 monitors the traffic and captures (e.g., on a periodic basis, such as every five minutes) a "snapshot" of connection statistics and compares that snapshot with the baseline. When comparisons indicate that certain types of traffic are sending or receiving anomalous amounts of data or initiating anomalous numbers of connections to other machines, this indicates that a threat is present. An anomalous amount results when a comparison results in a difference that exceeds a certain predefined threshold (e.g., a change by more than a certain percentage, such as 35%). It is noteworthy that when using a %, the sensor device can also use some minimum absolute amount as an additional requirement to indicate a threat is present. For example, if there are only two connections established in the baseline, a snapshot with four connections is a 100% increase, but does not indicate a threat. In such an example, the minimum absolute amount can be, for example, fifty connections, so that the presence of a threat is at least fifty connections plus an increase in the snapshot by the threshold percentage.

When a threat is indicated, the sensor device 165 initiates notifications (e.g., to the management server, or to users associated with the anomalous statistics) of anomalous behavior. For example, a statistics message, described in more detail below, can be used for such notification. In addition to the notifications, the sensor device 165 can terminate traffic flows that are deemed harmful. For example, the sensor device 165 can terminate TCP sessions using TCP resets and/or terminate UDP by dropping the associated packets.

Figure 5:
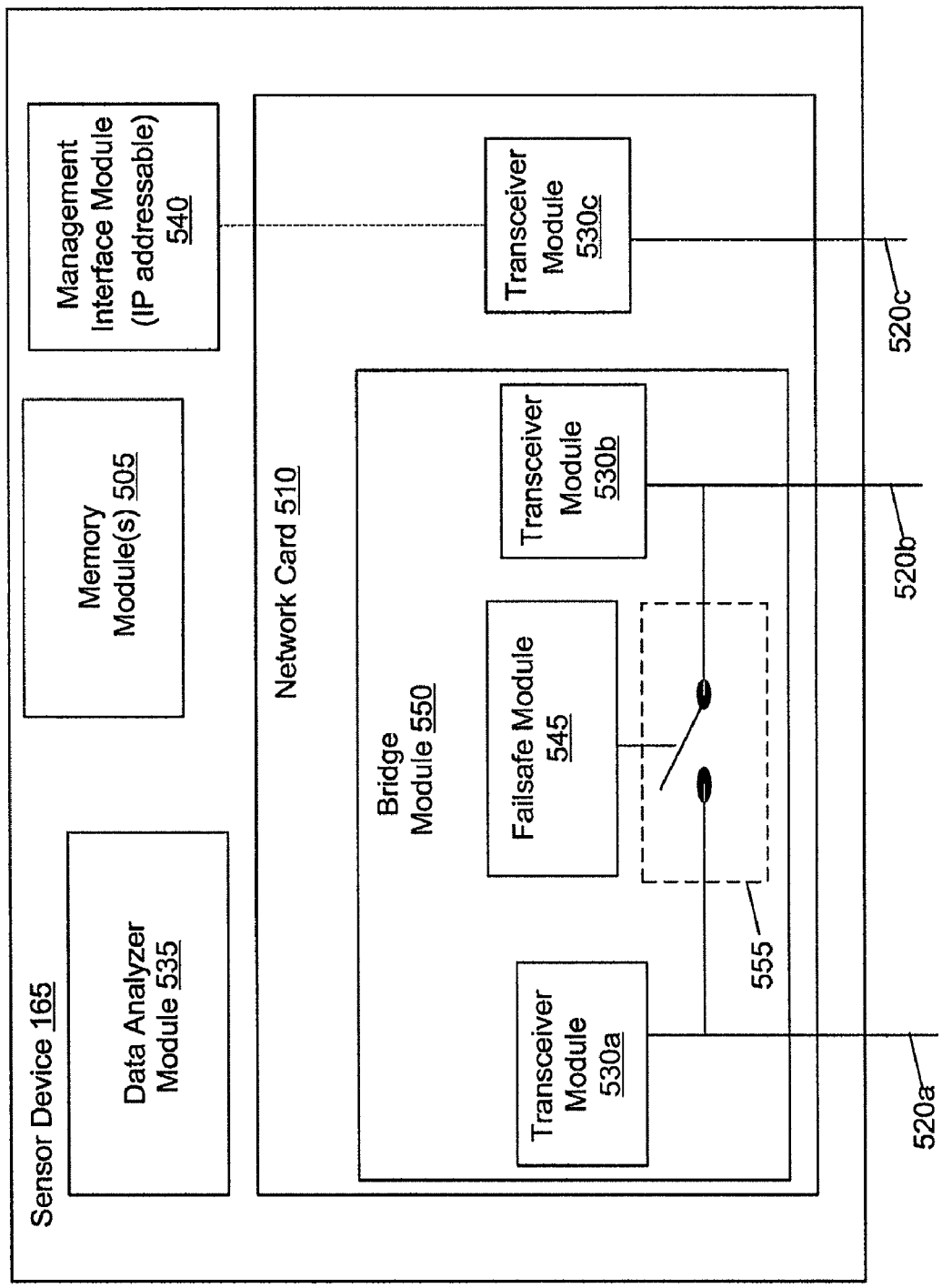
FIG. 5 is a block diagram of a network appliance used for propagation protection within a network.

FIG. 5 illustrates an example of some of the components of the sensor device 165. The sensor device 165 includes on or more memory modules 505. For example, the memory module 505 can include a compact flash (CF) card. The memory module 505 provides storage for the operating system and a persistent storage area. The memory module 505 can also include an extended CMOS in which a signature can be stored. In one example, the size of this signature is six bytes. The binary of the sensor device 165 is tied to the basic input/output system (BIOS) of the sensor device 165, thereby preventing it from being utilized on another piece of equipment. In some examples, this tie is maintained by the signature written into the extended CMOS, which the sensor device 165 checks on load of its operating system. The BIOS can include the following functionality: console redirection, universal serial bus (USB) boot support, quick boot, SLP/equivalent BIOS support, and the ability to write to the extended CMOS at least 12 bytes (e.g., 3 blocks of 4 bytes). The BIOS can be, for example, PHEONIX I AWARD 6.00+.

In addition to the image protection, the sensor device 165 also includes a network card 510. The network interface card (NIC) 510 includes three network interfaces 520a, 520b, and 520c. The network card 510 also includes transceiver modules 530a, 530b, and 530c, corresponding to the network interfaces 520a, 520b, and 520c, respectively. The transceiver modules 530a, 530b, and 530c receive data from and transmit data to the network according to a compatible technology of the network (e.g., for a LAN, Ethernet technology according to an IEEE 802.3 standard). The transceiver modules 530a, 530b, and 530c also receive data from and transmit data to the other internal modules (e.g., the memory module 505, a data analyzer module 535, and/or a management module 540) of the sensor device 165, via one or more internal busses (not shown).

The interfaces 520a and 520b, the transceivers 530a and 530b, and a failsafe module 545 provide the bridging functions described herein and are included as part of a bridge module 550. The interface 520a is connected to the first portion of the network and the interface 530b is connected to the second portion of the network. Under normal operation and in general, the bridging module 550 isolates the interface 520a from the interface 520b. Data from the first portion of the network is received via the interface 520a by the transceiver module 530a and transmitted to, for example, the data analyzer module 535. The data analyzer module 535 is configured to analyze the data according to one or more of the techniques described herein. If the sensor device 165 determines that the data does not represent a threat, the data is transmitted to the transceiver module 530b and transmitted via the interface 520b to the second portion of the network.

In no power and failure conditions, the failsafe module 545 connects the interface 520a with the interface 520b using, for example, a relay switch 550 that is normally closed in the unpowered state. With the switch 550 closed, the data flows directly from the interface 520a to the interface 520b with no processing by the bridge module 550. In other words, the bridge module 550 is configured so that the network card 510 will fail completely open (i.e., in an unpowered/failed state, the card is a complete pass-through, looking like any other network cable and all traffic is passed through the sensor device 165). In some examples, there can also be additional relay switches (not shown) that are located between the interfaces 520a and 520b and the transceivers 530a and 530b. These additional relay switches are normally open in the unpowered state and serve to isolate the interfaces from the transceivers 530a and 530b in a failure state.

When power is provided to the sensor device 165 and a heartbeat is received by the network card 510, the bridge module 550 functions as a bridge. However if any part of the software fails, the heartbeat is not received and the network card 510 falls back to passive mode (e.g., the switch 555 closes). To detect a software failure, a watchdog timer can be used to supply the heartbeat to the network card 510. In addition or as an alternative, the sensor device 165 can also monitor a particular file that is continuously used to ensure that the file is being continuously accessed, indicating normal operation.

The following describes an example of the hardware components that can be used to implement a sensor device 165. The sensor device 165 can include physical ram (e.g., 512 MB or more) and a VIA motherboard and chipset (e.g., VIA/Intel/

AMD 1.0 GHZ+CPU (i686 must have CMOV instruction)). The sensor device 165 can include a peripheral component interconnect (PCI) bus with at least one 32-bit slot for a failover NIC. The sensor device 165 can include an IDE/ATA bus with an IDE/ATA controller for dual channel bus mastering. The first IDE/ATA channel can include an IDE/ATA flash drive adapter with 128 MB compact flash memory as the primary drive and an IDE/ATA flash drive adapter with 128 MB compact flash memory as the secondary drive. The second IDE/ATA channel can include an IDE/ATA hard drive. The sensor device 165 can include a USB with a universal host controller interface (UHCI) and/or enhanced host controller interface (EHCI) that is compatible with the USB 1.1 and/or USB 2.0 standards. The sensor device 165 can include an external serial bus port.

To support the bridge module 550, the sensor device 165 can include a 2 port (e.g., for the interfaces 520a and 520b) 100 Mbit failover NIC card. The failover NIC card can include a hardware watchdog and bypass. The failover NIC card can also include the ability to set to the failover switch (e.g., the switch 555) to bypass or to normal (e.g., open) at power on, the ability to program via a simple API, header for status indicators, and MDI-X compatibility. The sensor device 165 can include a single port (e.g., for the interface 520c) 100 Mbit on board NIC to communicate with the management server 145. As illustrated in FIG. 5, the three ports can be included on a single network card 510. For example, Emerging Technologies (http://www.etinc.com) offers two models of Ethernet bypass cards, ET/GigFailover and ET/Failover. The sensor device 165 can include a power supply compliant with the ATX or mini ATX specifications.

The chassis of the sensor device 165 can be a UL/RFI certified, 19" rack mountable chassis with one or more cooling fans. The exterior of the chassis can include buttons for turning the power on and off, for resetting the hardware and for resetting the software back to the factory default settings. The exterior of the chassis can include light emitting diodes (LEDs) for indicating states and activities, such as for the management NIC (e.g., link/activity), the failover NIC port 1 (e.g., link/activity), the failover NIC port 2 (link/activity), the failover status (e.g., normal/bypass), the power indicator (e.g., on/off), the hard drive and/or flash access, etc. The exterior of the chassis can include slots for the compact flash disk 1 access, with a slow release button, for the compact flash disk 2 access, with a slow release button, the NIC bypass card port 1, the NIC bypass card port 2, the NIC management port, the console port (e.g., a serial port), the first USB port from root hub (e.g., a USB controller), the second USB port from root hub (e.g., a USB Controller), a power connection (e.g., a national electrical manufacturers association (NEMA) compliant power connection), etc.

The three NIC ports (e.g., the interfaces 520a, 520b, and 520c) can each have their own media access control (MAC) address. Additionally, the administrative organization or the manufacturer of the sensor device 165 can obtain its own organizationally unique identifier (OUI) (also known as an Ethernet vendor ID) to be used as the first portion of the Ethernet address. The device can be initially configured with a web browser. A graphic interface can be provided locally by each sensor device 165.

The third interface 520c provides the management communications facility and is in communication with the management interface module 540. The management interface module 540 is assigned a physical IP address so that the management server 145 can communicate with the sensor device 165. The third interface 520c can be connected to either side of the sensor device 165 (e.g., connected to the interface 520a or the interface 520b). The management interface module 540 is configured to register a sensor device 165 with the management server 145 and to process messages to and from the management server 145. The description that follows describes an example of the registration process and some exemplary messages transmitted between the sensor device 165 and the management server 145.

A user can use a UI generated by the management server 145 to register a sensor. When a user chooses to add a device in the web UI, the user specifies the IP address that has been assigned to the sensor 165, the name of the sensor, and whether they wish the sensor to be "active" or not. This process can be referred to as "registering a device". When registering a new device, the device 165 is preferably already in place in the network. By default, the device 165 can be inactive until the registration message is received. The registration message can contain the following information: device registration message type indicator, device ID (the device can treat this as unsigned), and activation indicator (e.g., this indicator can be either 0 (indicating the sensor 165 should not yet analyze traffic) or 1 (indicating the sensor 165 should start analyzing traffic and reporting virus activity to the mgmt station)).

The sensor 165 can reply with a REPLY_OK message if the sensor 165 receives the message and can verify that its device id is now set to the device id specified in the registration message and that the sensor 165 is in the state specified (e.g., active or inactive) by the message. If any part of this fails, the device 165 remains running but is inactive and sends a REPLY_NOT_OK message.

A control software application executing in the management server 145 can recognize the response to this message (lack of response should be handled as REPLY_NOT_OK if for any reason communication is not possible) and act accordingly. For example, upon receiving a REPLY_OK, the control application notifies the UI that the registration was successful and the UI should now include the new device. Upon receiving a REPLY_NOT_OK (or no response), the control application can remove the record for that sensor from the database so that the device does not appear in the UI. The control application can also report to the UI that the registration was unsuccessful and the UI alerts the user, stating that the device could not be added. In some examples, the UI displays different messages for the REPLY_NOT_OK and NO_REPLY cases, as the user may have to adjust his or her network configuration if the control application cannot communicate with the device at all. In some examples, once a sensor 165 is registered, upon reboot, the sensor 165 maintains whatever status (e.g., active or inactive) and device ID that sensor had before the reboot. Once registered, the sensor device 165 responds to further registration messages with REPLY_NOT_OK (to indicate to the management server 145 that there might be a problem, as the device should already be registered).

The sensor 165 and management server 145 communicate with each other using defined messages. The messages can be laid out in a tree format for efficient transmission. The sensor 165 can send to the management server 145 an event message, a resource message, or a statistics message. The event message represents a report to the management server 145 from the sensor 165 indicating the types of events the sensor 165 has seen since the previous report, their sources (and optionally their destinations), and their frequency. For example, the event message can include the following fields: a device id, a timestamp (e.g., u32, seconds since Jan. 1, 1970), a message type indicator (e.g., 0x10 indicating an event message), a signature type indicator (e.g., Cymtec=0x00, vendor ABC=0x10), a signature name length (e.g., in bytes), and a n-byte signature name (as indicated by the signame length field), a source IP address, a destination IP address, an event counter, and a time since last occurrence (e.g., UNIX timestamp format, seconds). Whether destination addresses are gathered can be signature-specific. If destination addresses are present, the event counter and time since last occurrence fields can be specific to the destination address under which they appear. When no destination addresses are present, the event counter and time since last occurrence fields can refer to the source address they follow. As a special case, an empty event message may be sent as a way of indicating to the management station that a sensor is up and running, even though it has no events to report. In this case, the message can include the device id, a message timestamp, and the event message type indicator with no following content.

The resource message is a status message from the sensor 165 to the management server 145 indicating how much of its available resources a sensor 165 is using. In one example, the message specifies three different values: cpu utilization %, memory utilization %, and bandwidth. This message can be sent periodically and, if so, the values can represent averages over the period of time specified in the message. For example, the resource message can include the following fields: a device id, a timestamp (e.g., u32, seconds since Jan. 1, 1970), a message type indicator (e.g., 0x50 indicating a resource message), a time_t (e.g., uint32) value for the start time of the report period, a time_t (e.g., uint32) value for the end time of the report period, an average percent (e.g., integer) CPU utilization on the sensor 165 over the reporting period, an average percent (e.g., integer) memory utilization on the sensor 165 over the reporting period, a bandwidth (e.g., in bytes) through the bridge on the sensor 165 over the reporting period.

The statistics message represents a report to the management server 145 from the sensor 165 indicating the types of traffic it has seen since the previous report, tracking any connections established, the endpoints of the connections, and the amount of data sent in each direction. For example, the statistics message can include the following fields: a device id, a timestamp (e.g., u32, seconds since Jan. 1, 1970), a message type indicator (e.g., 0x11 indicating an stats message), a client IP address, a destination port, a server IP address, a time_t starttime (e.g., UNIX timestamp format, seconds), a time_t endtime (e.g., UNIX timestamp format, seconds), a connection count, a number of bytes to the identified server, and a number of bytes from the identified server.

The management server 145 can send to the sensor 165 a pause message, a signature activation message, a signature update message, or a signature update package message. The pause message can include a message type indicator that indicates whether the device should "Pause" (e.g., message type indicator 0x30) or "Unpause" (e.g., message type indicator 0x31). A "Pause" indication indicates to the sensor 165 that the sensor 165 should stop analyzing the data and act as a pass-through device until the sensor 165 receives an "Unpause" indication. In one example, this message can be limited to a total message length of 1 byte (fixed). The sensor 165 can reply with REPLY_OK on success or REPLY_NOT_OK if it fails to pause/unpause for any reason.

The signature activation message can include a message type indicator that indicates whether the device 165 should activate the identified signature (e.g., message type indicator 0x40) or deactivate the identified signature (e.g., message type indicator 0x41). The signature activation message can also include the id of the signature to be activated or deactivated. In one example, this message can be limited to a total message length of 5 bytes (fixed). The sensor can reply with REPLY_OK on success or REPLY_NOT_OK if it fails to turn the signature on/off for any reason. For example, the threat profiles in Table 1 included an active indication parameter, where the value for an active threat is "1" and the value for an inactive threat is "0". In such an example, the sensor device 165 changes the value of this parameter upon receipt of a signature activation message. For example, if the signature activation message indicates a particular threat profile should be activated, the sensor device 165 stores a value of "1" for the value of the active indication parameter for that threat profile. If the signature activation message indicates a particular threat profile should be deactivated, the sensor device 165 stores a value of "0" for the value of the active indication parameter for that threat profile.

The signature update message can include a message type indicator that indicates that the device 165 should update with a new signature set (e.g., message type indicator 0x85). The rest of the message can be an unstructured binary stream containing the new signature set. Upon finishing the download, the sensor can attempt to parse and add the new signature set. On success, the sensor 165 replies (e.g., over the same session) to the management server 145 with a REPLY_OK message. It is also possible for the sensor 165 to reject the new signature set if the sensor 165 cannot understand any part of the content. In this case, instead of the REPLY_OK response, the sensor 165 sends a REPLY_NOT_OK and reverts back to the previous (working) signature set. In some examples, the signatures are in a simple clear-text format, and the text of the message represents an ASCII file that the sensor 165 can save to a persistent memory module (e.g., disk, compact flash card, etc.) and parse upon completion. In some examples, the sensor 165 does not track signature set "versions". In such examples, the management server 145 tracks the versions (e.g., to display to the end user), and the sensor 165 simply assumes that whatever signatures the sensor 165 currently has (or has just received) are the signatures the sensor 165 should be using (e.g., the current versions). The signatures can be partially updated. If the sensor cannot accept partial updates, the signature set included in this message can contain every signature appropriate for the sensor 165, and the sensor 165 will replace its entire signature set with the one contained in this message.

The signature update message is unformatted to allow for flexibility. In other examples, the signature update can be defined as a specific package. For example, the signature update package message can include the following fields: a message type indicator, a package size (e.g., in bytes), a signature package version, a Cymtec signatures section that includes for each signature in the package [a signature marker, a signature name length, a signature name (e.g., n bytes as specified by the signature name length), a DocUrl length, a DocUrl (e.g., n bytes as specified by the DocUrl length), a signature length, and a signature (e.g., n bytes as specified by the signature length)], and an ABC Corp. signatures section that includes for each file in the package [a file marker, a file name length, a file (e.g., n bytes as specified by the file name length), a file length, and a file (e.g., n bytes as specified by the file length)].

The sensor 165 can reply with REPLY_OK on success or REPLY_NOT_OK if the sensor 165 cannot use these signatures for any reason. In the above example, the Cymtec signatures section lists the individual signatures, their documentation URL, and the signature itself (in binary). The management server 145 can use the above format to parse the Cymtec signatures and preload them if desired. The ABC Corp. signatures section lists the files that comprise the virus database from ABC Corp. that the ABC Corp. engine uses to scan for viruses. The management server 145 can stop parsing the message when it gets to this point.

The sensor 165 is responsible, upon reception of this message, for installing the rules and checking to make sure they are usable. If for any reason any piece of this signature package cannot be used, the sensor 165 rejects the entire signature package and replies with the REPLY_NOT_OK message, rolling back to its previous "good" signature set.

Figure 6:
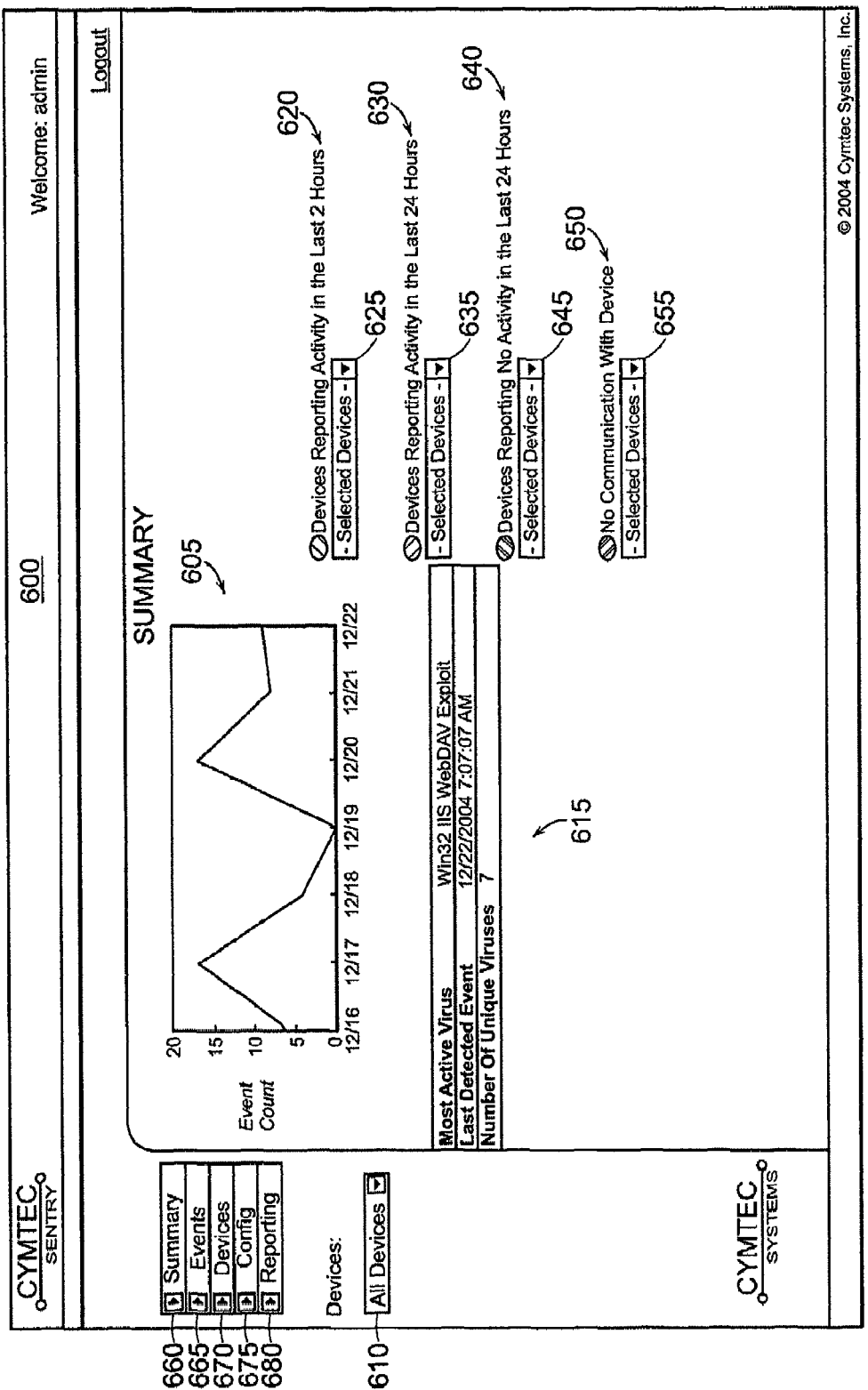
FIG. 6 is a screen shot illustrating an exemplary user interface for monitoring propagation protection within a network.

FIGS. 6-10 illustrate examples of screen shots generated while interacting with a management server 145. The exemplary screen shots illustrate some examples of features and information available to a user through GUIs. FIG. 6 illustrates a screen shot 600 showing a summary of activities reported by the sensor devices 165 in the associated network. The screen shot 600 includes a graph 605 that summarizes the events reported to the management server 145 over a particular time frame. In the graph 600, the number of events is plotted for each day over a period of one week. This advantageously enables an administrator to see when the greatest number of events took place and visually spot any trends that might be occurring on the network.

The screen shot 600 includes a drop down menu 610 that enables a user to select the devices 165 from which reported events are included in the graph 605. In the illustrated example, all devices that are registered with the management server 145 have been selected. The administrator can use drop down menu 610 to change devices and the management server 145 changes the summary graph 605 in response, plotting only the events received from the selected device(s). In some examples, the drop down menu 610 includes entries for each of the registered devices themselves and any combination of the registered devices. An area 615 includes other useful summary information, such as the most active virus reported in the graph 605, the date and time of the last detected event, and the number of unique viruses reported in the events. The information in the area 615 also changes in response to a user selection in the drop down menu 610. Similarly, areas 620, 630, 640, and 650 include drop down menus 625, 635, 645, and 655, respectively, to enable a user additional elements to change the summary information in the graph 605 and the area 615. The 620, 630, 640, and 650 group the devices into categories of reporting. The area 620 represents devices that have very recently reported an event (i.e., in the last 2 hours). Any devices that have reported events in the last two hours are listed in the drop down menu 625. The user can then select one of these devices (or some combination) and the graph 605 and the summary information area 615 change accordingly, displaying information for the selected device(s). The area 630 represents devices that have recently reported an event (i.e., in the last 24 hours). Any devices that have reported events in the last twenty-four hours are listed in the drop down menu 635. The user can then select one of these devices (or some combination) and the graph 605 and the summary information area 615 change accordingly, displaying information for the selected device(s).

The area 640 represents devices where there has recently been a lack of reported activities (i.e., no events in the last 24 hours). Any devices that have not reported events in the last twenty-four hours are listed in the drop down menu 645. The user can then select one of these devices (or some combination) and the graph 605 and the summary information area 615 change accordingly, displaying information for the selected device(s). The time periods in areas 620, 630, and 640 represent examples, and the time periods can be configured by an administrator to suit the particular needs of the network. The area 650 represents devices with which there has been no communication. Any devices that have not communicated with the management server 145 are listed in the drop down menu 655. This enables the user to quickly identify devices that may have a failure condition or some other communication problems.

The screen shot 600 also includes elements 660, 665, 670, 675, and 680 that enable a user to navigate between screens and the different functions/features that the GUI generated by the management server 145 provides. The elements 660, 665, 670, 675, and 680 can be, for example, buttons, hyperlinks, etc. The "Summary" element 660 navigates the user to a summary screen, for example, the summary screen shot 600 in FIG. 6. The "Events" element 665 navigates the user to an events screen, for example, an events screen shot 700 in FIG. 7. The "Devices" element 670 navigates the user to a devices screen, for example, a devices screen shot 800 in FIG. 8. The "Config" element 675 navigates the user to a configuration screen, for example, a configuration screen shot 900 in FIG. 9. The "Reporting" element 680 navigates the user to a reports screen, for example, a reports screen shot 1000 in FIG. 10.

FIG. 7 illustrates an example of the events screen shot 700 to which a user can navigate when, for example, the user selects the element 665. The screen shot 700 displays details about events reported from one or more particular devices selected using the drop down menu 610. The screen shot 700 includes a table 705 that displays a collection of threats reported in the events received by the management server 145. In some examples, the threats represent the collection of threats reported in the events that are plotted in the graph 605. The screen shot 700 includes the dropdown menu 610 to enable the user to select devices from which reported events are included in the table 705. Similar to the screen shot 600, the administrator can use drop down menu 610 to change devices and the management server 145 changes the table 705 in response, listing only the events received from the selected device(s).

The table 705 includes five columns, an expansion/contraction column 710, a threat name column 715, a count column 720, a last occurrence column 725, and a remove column 730. The threat name column 715 lists the name of the threat and the IP address of the source/destination device from/to which the threat is transmitted. The count column 720 displays the number of events reported the threat (e.g., the number of occurrences). The last occurrence column 725 displays the date and time when the threat was last reported. The remove column 730 enables the user to remove that row (e.g., a threat and/or any sub-layers (e.g., IP addresses)) from the table 705.

The expansion/contraction column 710 enables the user to expand a particular event into finer details. For example, the hierarchical expansion can be threat name, source address, destination address, or source address, threat name, destination address, or the like. In the table 705, the first row displays all Internet relay chat (IRC) events reported to the management server 145 for all devices (i.e., as selected by the drop down menu 610). As indicated in the count column 720 for the first row, there were 12 events associated with the threat named "IRC Traffic". The second row of table 705 displays the IP address "75.150.2.210", which is the IP address of the source device from which the threat originated. As indicated in the count column 720, there were 12 events associated with the threat named "IRC Traffic" that originated from the IP address "75.150.2.210". The second and third rows of the table 705 display the IP addresses "139.209.233.147" and "139.255.73.106", which are the IP addresses of the destination devices to which the threat was transmitted. As indicated in the count column 720, there were 3 events associated with the threat named "IRC Traffic" that were transmitted to the IP address "139.209.233.147" and 9 events associated with the threat named "IRC Traffic" that were transmitted to the IP address "139.255.73.106".

The screen shot 700 also includes a drop down menu 735 that enables the user to select how the events are grouped in the table 705. In the screen shot 700, the user has selected to group the events in the table 705 by the threat name. The drop down menu 735 can also include, for example, source address. If such a selection were made by a user, the threat name column 715 is renamed as "Host IP" and the source IP address is listed in this column as the top-level entry. As given as an example above, the hierarchical expansion in such a case can be source address, threat name, destination address.

Figure 8A:
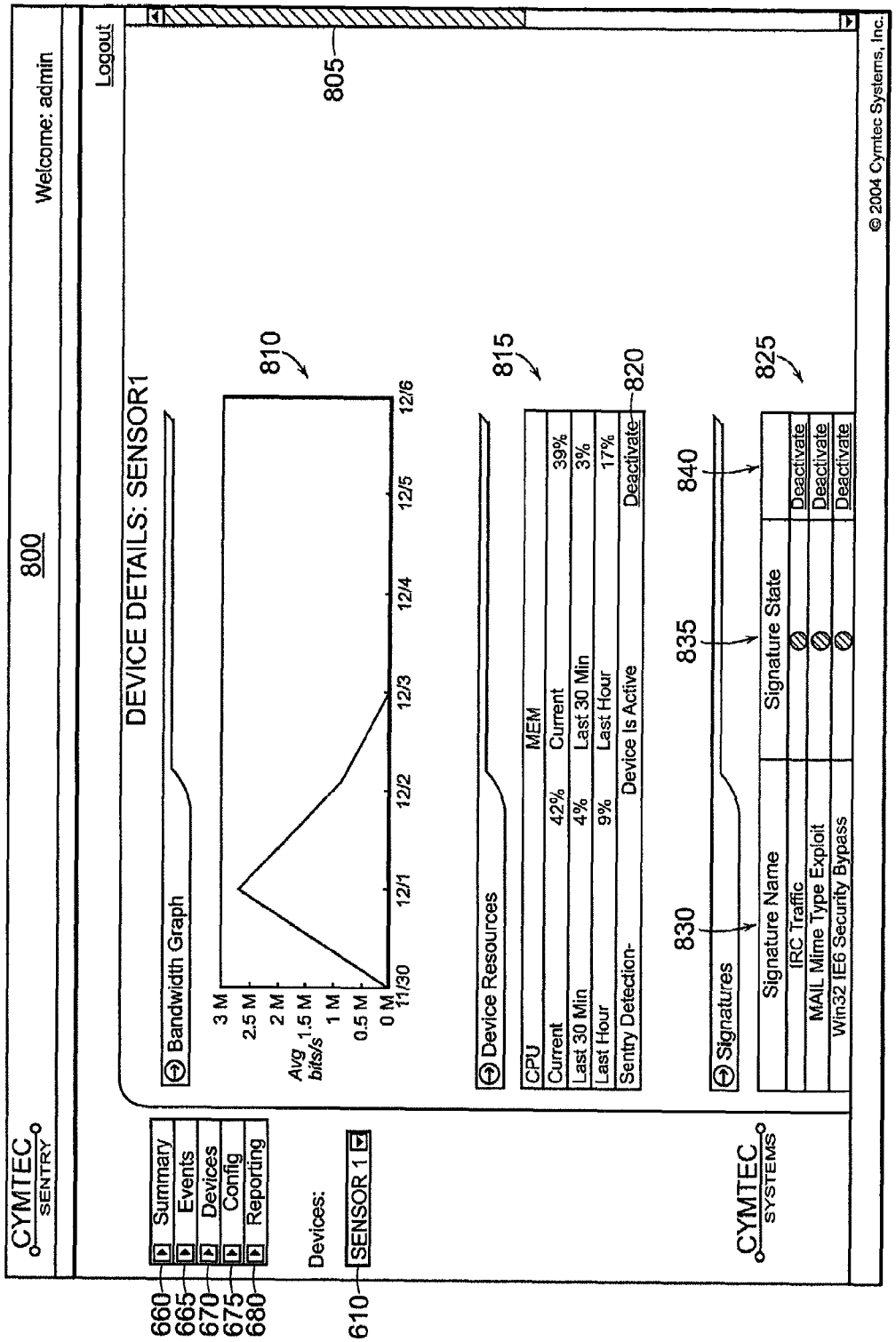
FIGS. 8A and 8B are screen shots illustrating another exemplary user interface for monitoring propagation protection within a network.
Figure 8B:
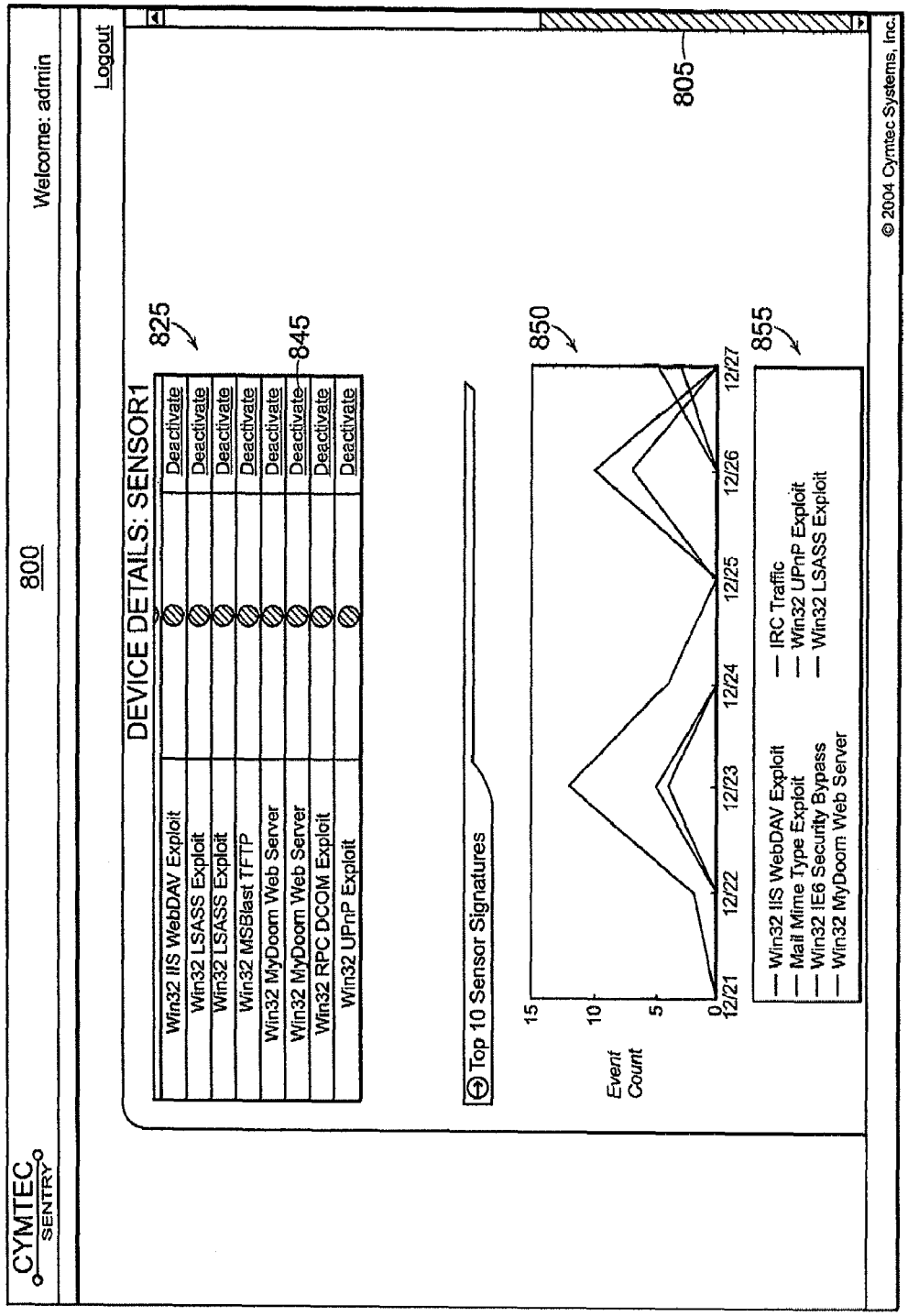

FIGS. 8A and 8B illustrate an example of the details screen shot 800 to which a user can navigate when, for example, the user selects the element 670. The screen shot 800 includes a top half (FIG. 8A) and a bottom half (FIG. 8B) that the user can continuously scroll between using a scroll bar 805. The screen shot 800 displays details about one or more particular devices selected by the user. In the screen shot 800, the user has selected "SENSOR1" using the drop down menu 610. The screen shot 800 includes a first graph 810 displaying the bandwidth (e.g., average bits/second) of the network traffic monitored by the sensor device SENSOR1 over a particular time frame (e.g., each day over a period of one week). This advantageously enables an administrator to see when the greatest bandwidth was required by that particular sensor device, visually spot any trends that might be occurring on the network, and visually detect how the demand for bandwidth on this particular device compares with reported threats.

The screen shot 800 includes a first table 815 displaying information on the utilization of resources (e.g., CPU, memory, etc.) by the selected sensor device over different periods of time. The first table 815 also indicates whether the selected sensor device is active (e.g., analyzing data) or inactive (e.g., acting as a pass-through network cable). The first table 815 includes a hyperlink 820 that enables the user to change the state of the selected sensor device. In the screen shot 800, the SENSOR1 sensor device is in an active state (as indicated in the first table 815) and the hyperlink 820 indicates (e.g., by displaying the word "deactivate", displaying the word "stop", displaying a red circle, etc.) that the hyperlink 820 represents a change to an inactive state if selected by the user. Similarly, if the SENSOR1 sensor device was in an inactive state, the hyperlink 820 would indicate (e.g., by displaying the word "activate", displaying the word "go", displaying a green circle, etc.) that the hyperlink 820 represents a change to an active state if selected by the user.

The screen shot 800 includes a second table 825 displaying information on the threat profiles the sensor device SENSOR1 is using when analyzing data being transmitted through the sensor device. The second table 825 has a signature name column 830, a signature state column 835, and a change activation column 840. The signature name column 830 lists the name of the threat profile. The signature state column 835 includes an indicator indicating the state of the threat signature (e.g., active or inactive) corresponding to the signature name in the same row using a color. For example, a green circle indicates that the corresponding threat signature is active for the particular sensor device, a red circle indicates that the corresponding threat signature is inactive for the particular sensor device, etc. Because the displayed details are specific to the selected device, the signature state for a signature name can vary from device to device. This advantageously enables an administrator to configure each sensor device 165 based on the placement of that sensor in the network. For example, some signatures may only need to be used for sensor devices at the edge of the network.

The change activation column 840 enables the user individually deactivate any of the signatures in the second table 825. For example, a row in the second table 825 includes a hyperlink 845 that enables the user to change the state of the corresponding signature (i.e., Win32 MyDoom Web Server) to an inactive state. In the screen shot 800, the Win32 MyDoom Web Server signature is in an active state (as indicated in the signature state column 835) and the hyperlink 845 indicates (e.g., by displaying the word "deactivate", displaying the word "stop", displaying a red circle, etc.) that the hyperlink 845 represents a change to an inactive state if selected by the user. For example, the threat profiles in Table 1 included an active indication parameter, where the value for an active threat is "1" and the value for an inactive threat is "0". In such an example, when the user selects the hyperlink 845, the management server 145 transmits a signature activation message to the sensor device SENSOR1 that includes a request to change the value of the active indication parameter for that signature (i.e., Win32 MyDoom Web Server) to an inactive state (i.e., in such an example, a value of "0").

The screen shot 800 includes a second graph 850 displaying the number of events for a particular threat profile reported by the sensor device SENSOR1 over a particular time frame (e.g., each day over a period of one week). The second graph 850 is accompanied by a legend 855 that provides an indication of which threat profile is represented by which line in the second graph 850. The indication can be, for example, a different color or a different symbol.

Figure 9A:
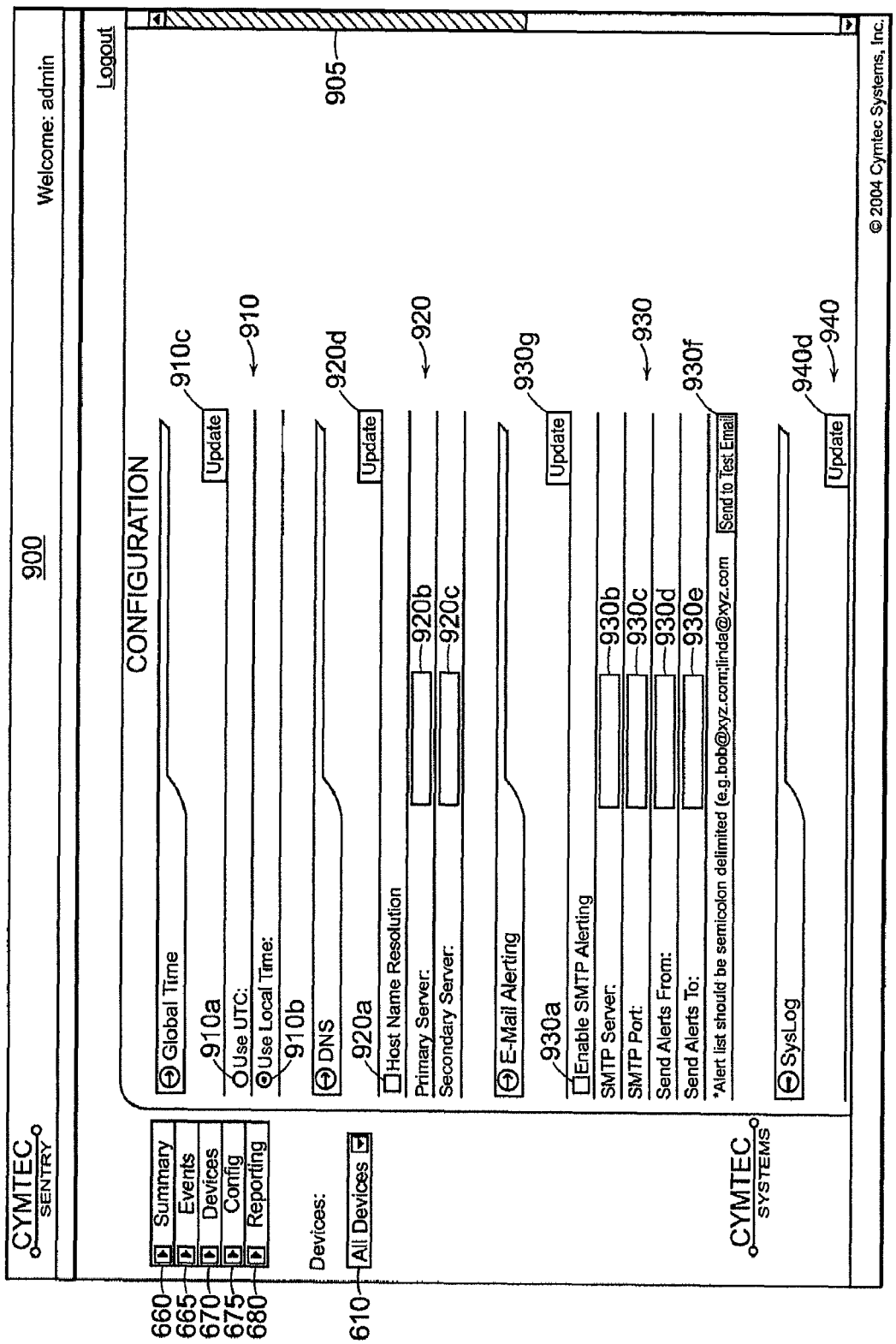
Figure 9B:
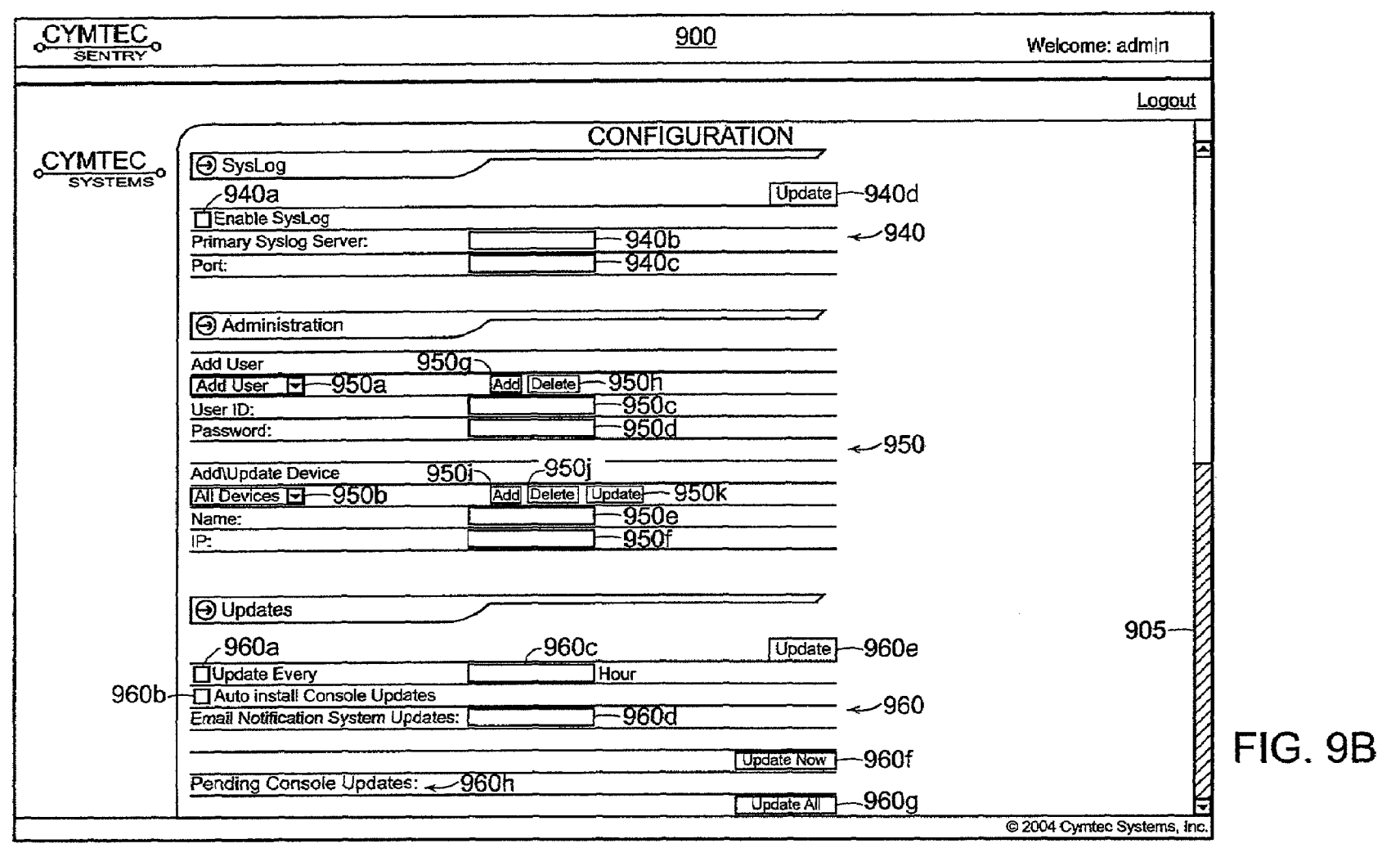

FIGS. 9A and 9B illustrate an example of the configuration screen shot 900 to which a user can navigate when, for example, the user selects the element 675. The screen shot 900 includes a top half (FIG. 9A) and a bottom half (FIG. 9B) that the user can continuously scroll between using a scroll bar 905. The screen shot 900 displays multiple user interface elements to enable a user to configure one or more particular devices selected by the user. In the screen shot 900, the user has selected "All Devices" using the drop down menu 610. The screen shot 900 includes a first group of user interface elements 910 displaying two selection elements 910a and 910b and an update button 910c. The first group of elements 910 is associated with configuring the time standard used, for example when reporting events. The selection elements 910a and 910b enable the user to select between global time and local time. The user selects the desired time to use and then selects the update button 910c. Upon selection of the update button 910c, the management server 145 transmits a message to the selected sensor device(s), in this case all of the devices, to configure themselves using the time selected in the selection elements 910a and 910b.

The screen shot 900 includes a second group of user interface elements 920 displaying a selection element 920a, two text entry elements 920b and 920c, and an update button 920d. The second group of elements 920 is associated with the domain name system (DNS) resolution. The selection element 920a enables the user to select whether the host name resolution is used. The text entry elements 920b and 920c enable the user to configure the addresses of the servers to use for host name resolution, when in use. Upon selection of the update button 920d, the management server 145 transmits a message to the selected sensor device(s), in this case all of the devices, to configure themselves using the configuration set in the second group of elements 920.

The screen shot 900 includes a third group of user interface elements 930 displaying a selection element 930a, four text entry elements 930b, 930c, 930d, and 930e, and action buttons 930*f* and 930*g*. The third group of elements 930 is associated with email alerting. The selection element 930*a* enables the user to select whether email alerting is enabled and the configuration of the email alerting when it is enabled. The text entry elements 930*b* and 930*c* enable the user to configure the addresses of the SMTP server and port from which the email alerts are sent. In general, an email alert is generated when any event is received from a sensor device 165. Although not shown, the email alert trigger can be also be configured separately. For example, the email alert trigger can include events corresponding to selected signatures, events corresponding to statistical changes, etc.

The text entry element 930*d* enables the user to configure the email address displayed as the sender of the email alert. This can be an administrator or some other special indication (e.g., "Threat Alert") so that the recipient immediately recognizes that the email alert is associated with an email alert. The text entry element 930*e* enables the user to configure one or more email addresses of those people to whom the email alert is sent. Upon selection of the update button 930*g*, the management server 145 transmits a message to the selected sensor device(s), in this case all of the devices, to configure themselves using the email alert configuration set in the third group of elements 930.

The screen shot 900 includes a fourth group of user interface elements 940 displaying a selection element 940*a*, two text entry elements 940*b* and 940*c*, and an update button 940*d*. The fourth group of elements 940 is associated with the system log. The selection element 940*a* enables the user to select whether the system log is enabled. The text entry elements 940*b* and 940*c* enable the user to configure the addresses of the server and port for maintaining the system log, when in use. Upon selection of the update button 940*d*, the management server 145 transmits a message to the selected sensor device(s), in this case all of the devices, to configure themselves using the configuration set in the fourth group of elements 940.

The screen shot 900 includes a fifth group of user interface elements 950 displaying two drop down selection elements 950*a* and 950*b*, four text entry elements 950*c*, 950*d*, 950*e*, and 950*f*, and action buttons 950*g*, 950*h*, 950*i*, 950*j*, and 950*k*. The fifth group of elements 950 is associated with adding administering users and sensor devices. The selection element 950*a* enables the administrator to perform an action associated with a user, such as add a new user, delete a user, change a user's ID and/or password, etc. In the screenshot 900, the administrator has chosen to add a new user. The administrator enters the new user's ID into text entry element 950*c* and password into text entry element 950*d*. When the administrator has entered the information, the administrator selects the add button 950*g* to incorporate that user into the system.

Similarly, selection element 950*b* enables the administrator to perform an action associated with a sensor device 165, such as add a new sensor device, delete an existing sensor device, change a device's name and/or IP address, etc. In the screenshot 900, the administrator has not selected a specific device, so the button 950*i* is highlighted, indicating that the administrator can add another device to the system. The administrator enters the new device's name into text entry element 950*e* and IP address into text entry element 950*f*. When the administrator has entered the information, the administrator selects the add button 950*i* to incorporate that device into the system. Once incorporated, the device can be included in the drop down menu 610 and its data in any of the screen shots described herein (e.g., 600, 700, 800, 1000). If the administrator selects a specific device in the selection element 950*b*, then the delete button 950*j* and the update button 950*k* become highlighted, indicating that the administrator can update or delete the selected device.

The screen shot 900 includes a sixth group of user interface elements 960 displaying two selection elements 960*a* and 960*b*, two text entry elements 960*c* and 960*d*, and action buttons 960*e*, 960*f*, and 960*g*. The fifth group of elements 960 is associated with configuring updates. The updates can include updates to the management console application itself and/or updates to the threat signatures and/or analysis processes used by the sensor devices 165. The selection element 960*a* enables the user to configure periodic updates. The user enters the period of time (e.g., in hours) in the text entry element 960*c*. When the periodic updating is enabled, the management console application makes a request (e.g., via the management server 145) to a server established for providing such updates. For example, the server 145 can communicate with a Website of the manufacturer Cymtec Systems, Inc. to obtain updates for the management console and/or the sensor devices.

The selection element 960*b* enables the user to configure updates that automatically install themselves when they are received. Use of this feature advantageously allows the update procedure to be automated, without the need for user intervention. The text entry element 960*d* enables the user to enter the email addresses of the one or more users. The management console sends an email to the addresses entered into element 960*d* each time an update is installed automatically, so that the user(s) can see that the automatic update process is working. Upon selection of the update button 960*e*, the management console application configures its update process using the configuration set in the sixth group of elements 960.

If the automatic installation feature is not enabled, then updates are collected (e.g., stored and flagged) by the management console and appear in area 960*h*. An administrator can select the "Update All" button 960*g* and any pending updates listed in the area 960*h* are installed into the management console application and sent to the sensor devices, as applicable. This advantageously provides a manual update process, should an administrator desire more manual control over the update process.

The sixth group of elements 960 also includes the "Update Now" button 960*f* that enables a user to have another manual update process. Regardless of the configuration of the updates process (e.g., periodic checking, auto install, etc.), selection of the "Update Now" button 960*f* causes the management console to check for updates from a manufacturer's update server, and if there are updates to install them in the management console and/or the sensor devices at that time. This advantageously enables an administrator to perform an immediate update when that administrator knows of a new update. For example, if the automatic update period is every 24 hours, there may be a new threat that is discovered and added to the profiles sometime in the middle of that period. Instead of waiting for the next automatic update, the administrator can navigate to the screen shot 900 and select the "Update Now" button 960*f* to install that latest update immediately.

Figure 10:
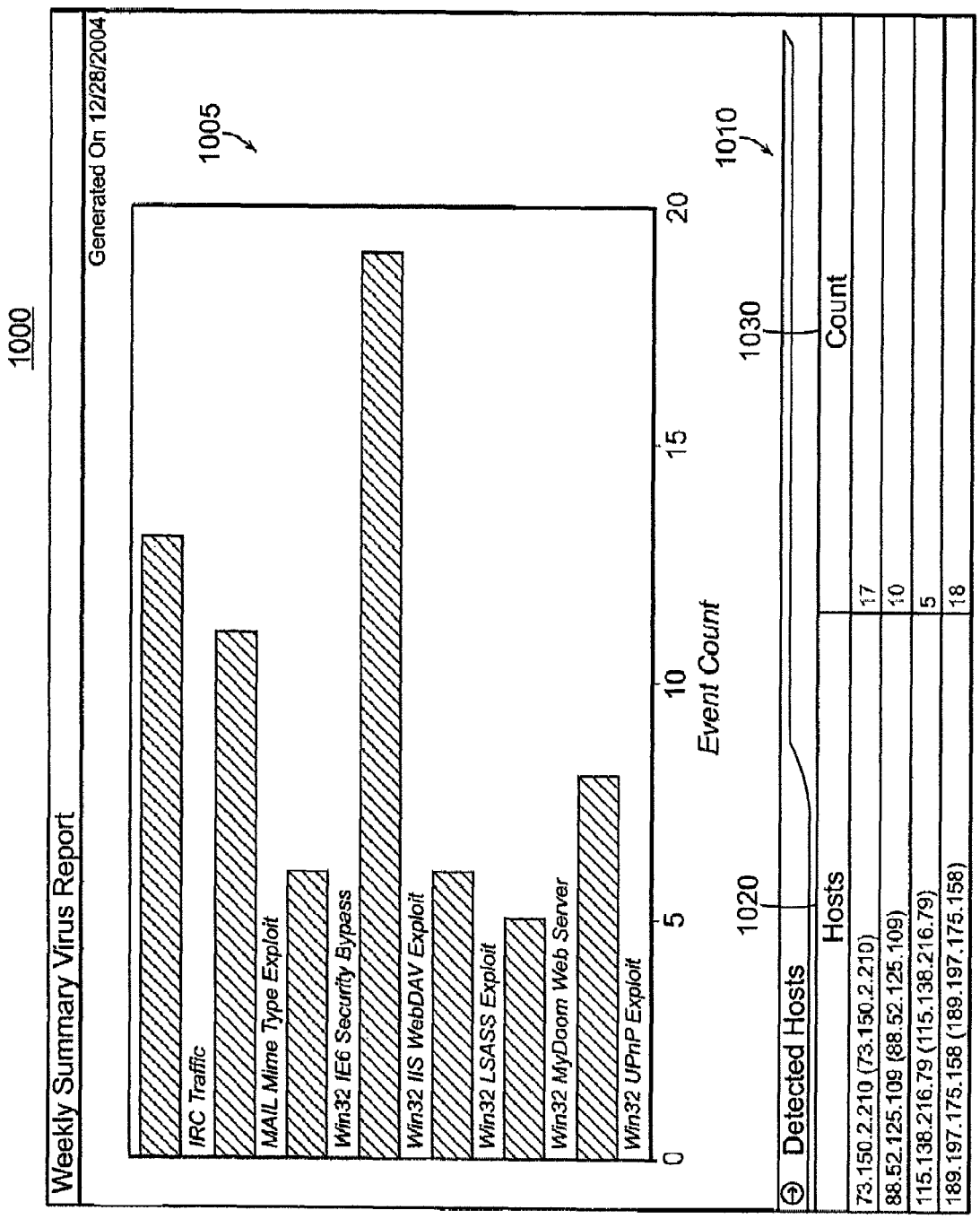
FIG. 10 is a screen shot illustrating another exemplary user interface for monitoring propagation protection within a network.

FIG. 10 illustrates an example of the reporting screen shot 1000 to which a user can navigate when, for example, the user selects the element 680 (e.g., in the screen shot 900 of FIG. 9). The screen shot 1000 displays details about the number of times a threat is reported on the network and the hosts (e.g., the originating devices) of those threats. The screen shot 1000 includes a bar graph 1005 that displays a summary of each threat reported and the number of times that the threat was reported as an event. The summary is for a particular time period, in this case one week. This advantageously enables an administrator to see which threats were the most prevalent on the network and visually spot any trends of a particular threat. The screen shot 1000 also includes a table 1010 that displays a collection of the hosts where a threat was detected in data originating from that device. The table 1010 includes an identity column 1020 and a count column 1030. The identity column 1020 displays the host device by its IP address. In FIG. 10, the IP address is repeated. In other examples, one of the IP addresses can be replaced with a host name, if one is available. The count column 1030 displays the number of threats reported from the particular host device in the corresponding row.

Various standards have been used in the examples above. Other examples, however, are not limited to the use of these standards. For example, email communication can follow the X.400 standard, extended simple mail transfer protocol (ES-MTP), post office protocol 3 (POP3), internet message access protocol (IMAP), Web-based email, etc.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results.

What is claimed is:

1. A computerized method for propagation protection within a network, the method comprising:
    monitoring, by a transparent network appliance, data being transmitted from a first portion of the network to a second portion of the network through the network appliance;
    analyzing, by the transparent network appliance, the data to determine whether the data represents a threat to the network;
    transmitting, by the transparent network appliance, the data to the second portion of the network if the data does not represent a threat to the network or preventing transmission of the data to the second portion of the network if the data represents a threat to the network and transmitting, by the transparent network appliance, the data between the first portion of the network and the second portion of the network upon a failed or powerless condition of the transparent network appliance; and
    establishing, by the transparent network appliance, one or more connection statistics on the data from the first portion of the network to the second portion of the network wherein the one or more connection statistics include at least one connection statistic not dependent on a threat.

2. The method of claim 1, further comprising generating an alert when the data represents a threat to the network.

3. The method of claim 2, further comprising transmitting the alert to a management server.

4. The method of claim 1, further comprising terminating a (Transmission Control Protocol) TCP session associated with the data if the data represents a threat to the network.

5. The method of claim 1, wherein analyzing comprises comparing the data with known threat profiles.

6. The method of claim 1, further comprising calculating current statistics associated with the data; and comparing the current statistics with the established statistics.

7. The method of claim 1, wherein the one or more connection statistics comprise a number of connections initiated by a host, a type of connection initiated by the host, or an amount of data transferred from or to the host.

8. The method of claim 1, further comprising, receiving, by a management server, a message from the network appliance.

9. The method of claim 8, wherein the message includes an event message, a resource message, or a statistics message.

10. The method of claim 1, further comprising, receiving, by the network appliance, a message from a management server.

11. The method of claim 10, wherein the message includes a pause message, a signature activation message, a signature update message, or a signature update package message.

12. The method of claim 1, further comprising, assigning an Internet Protocol (IP) address to the network appliance.

13. The method of claim 1, further comprising, remotely upgrading the network appliance.

14. The method of claim 13, wherein remotely upgrading includes updating one or more threat profiles.

15. The method of claim 13, wherein remotely upgrading includes updating one or more threat analysis methods.

16. The method of claim 1, further comprising, enabling a user to restore the network appliance to factory defaults.

17. The method of claim 1, further comprising, automatically resetting, by the network appliance, to a previous configuration upon a failed condition.

18. The method of claim 1, further comprising, generating a Web interface to configure the network appliance to a specific configuration.

19. A transparent network appliance for propagation protection within a network, the network appliance comprising:
   a transparent network interface card configured to act as a bridge between a first portion of the network and a second portion of the network;
   a failsafe circuit configured to transmit data between the first portion of the network and the second portion of the network in a failed or powerless condition of the transparent network appliance;
   a data analyzer module tangibly embodied in electronic circuitry or a computer readable medium, the data analyzer module configured to analyze data transmitted from the first portion of the network to the second portion of the network to determine whether the data represents a threat to the network and to transmit the data to the second portion of the network if the data does not represent a threat to the network or prevent transmission of the data to the second portion of the network if the data represents a threat to the network and configured to establish one or more connection statistics on the data from the first portion of the network to the second portion of the network, wherein the one or more connection statistics include at least one connection statistic not dependent on a threat.

20. The method of claim 1 wherein establishing further comprises establishing, by the transparent network appliance, one or more statistics comprising types of traffic established since a previous report established by the transparent network appliance, endpoints of connections of the data, and the amount of data sent through the transparent network appliance.

21. The network appliance of claim 19 wherein the failsafe circuit is further configured to monitor for a failed condition.

22. The network appliance of claim 19 further comprising a memory device.

23. The network appliance of claim 22 wherein the memory device comprises a compact flash card.

24. The network appliance of claim 22 further comprising an extended CMOS device including a binary image of a Basic Input Output System (BIOS) of the network appliance tangibly embodied therein.

25. The network appliance of claim 19 further comprising an interface configured to communicate with a management module tangibly embodied in electronic circuitry or a computer readable medium located external to the network appliance.

26. The network appliance of claim 25 where the interface is associated with an Internet Protocol (IP) address.

27. The network appliance of claim 19 further comprising a serial interface, including a software console to enable IP address assignment for the network appliance and to enable initialization of the network appliance.

28. A computer program product, tangibly embodied in a machine-readable storage device, for propagation protection within a network, the computer program product including instructions being operable to cause a data processing apparatus to:
   monitor, by a transparent network appliance, data being transmitted from a first portion of the network to a second portion of the network through the network appliance;
   analyze, by the transparent network appliance, the data to determine whether the data represents a threat to the network;
   transmit, by the transparent network appliance, the data to the second portion of the network if the data does not represent a threat to the network or prevent transmission of the data to the second portion of the network if the data represents a threat to the network;
   establish, by the transparent network appliance, one or more connection statistics on the data from the first portion of the network to the second portion of the network, wherein the one or more connection statistics include at least one connection statistic not dependent on a threat; and
   transmit, by the transparent network appliance, the data between the first portion of the network and the second portion of the network upon a failed or powerless condition of the transparent network appliance.

29. The network appliance of claim 19 wherein the data analyzer module is configured to establish one or more statistics comprising types of traffic established since a previous report established by the transparent network appliance, endpoints of connections of the data, and the amount of data sent through the transparent network appliance.

30. The computer product of claim 28 being operable to cause data processing apparatus to establish, by the transparent network appliance, one or more statistics comprising types of traffic established since a previous report established by the transparent network appliance, endpoints of connections of the data, and the amount of data sent through the transparent network appliance.

31. The network appliance of claim 19 wherein the data analyzer module is configured to calculate current connection statistics associated with the data and compare the current connection statistics with the established connection statistics.

32. The computer product of claim 28 being operable to cause data processing apparatus to calculate current connection statistics associated with the data and compare the current connection statistics with the established connection statistics.

* * * * *